United States Patent
Smythe

(10) Patent No.: US 8,002,004 B2
(45) Date of Patent: Aug. 23, 2011

(54) DELIMB ARM CAM STOP

(75) Inventor: Justyn P. Smythe, Cambridge (NZ)

(73) Assignee: Waratah NZ Limited, Tokoroa (NZ)

( * ) Notice: Subject to any disclaimer, the term of this patent is extended or adjusted under 35 U.S.C. 154(b) by 5 days.

(21) Appl. No.: 12/483,282

(22) Filed: Jun. 12, 2009

(65) Prior Publication Data

US 2010/0313999 A1    Dec. 16, 2010

(51) Int. Cl.
*A01G 23/095* (2006.01)
(52) U.S. Cl. .................................. 144/24.13
(58) Field of Classification Search ............ 144/4.1, 144/24.13, 335, 338, 343, 382, 391, 392, 144/393, 394, 402, 403, 404; 294/88, 104; 241/101.73
See application file for complete search history.

(56) References Cited

U.S. PATENT DOCUMENTS

| | | | | |
|---|---|---|---|---|
| 4,194,542 | A * | 3/1980 | Eriksson | 144/24.13 |
| 4,576,406 | A * | 3/1986 | Johnson et al. | 294/86.41 |
| 5,219,010 | A * | 6/1993 | Eriksson | 144/24.13 |
| 5,330,242 | A * | 7/1994 | Lucky, Sr. | 294/88 |
| 5,975,168 | A * | 11/1999 | Ericksson | 144/343 |
| 6,065,513 | A * | 5/2000 | Paakkunainen | 144/24.13 |
| 6,729,372 | B1 * | 5/2004 | Koster et al. | 144/343 |
| 6,962,178 | B2 * | 11/2005 | Duval | 144/3.1 |

FOREIGN PATENT DOCUMENTS

WO    2009/035434 A1    3/2009

OTHER PUBLICATIONS

Background Information (1 page)(prior art before Jun. 12, 2009).
HTH616 Product Brochure (2 pages)(prior art before Jun.12, 2009).
Images of HTH616 Harvesting Head (6 pages)(prior art before Jun. 12, 2009).
Images of HTH616 Delimb System (8 pages)(prior art before Jun. 12, 2009).
HTH622B Product Brochure (2 pages)(Oct. 2006).
Images of HTH622B Harvesting Head (6 pages)(prior art before Jun. 12, 2009).

(Continued)

*Primary Examiner* — David J. Walczak
*Assistant Examiner* — Jennifer C Chiang

(57) ABSTRACT

A timber-working head comprises a frame, first and second delimb arms pivotally coupled to the frame, and a single delimb cylinder operatively coupled to both the first delimb arm and the second delimb arm to pivot the first and second delimb arms relative to the frame to open and close them. The first and second delimb arms are otherwise operatively unconnected from one another allowing pivotal movement of each of the first and second delimb arms without corresponding pivotal movement of the other of the first and second delimb arms. The second delimb arm comprises a cam stop defining a variable closure point for the first delimb arm, and the first delimb arm is configured to pivot into closed engagement with the cam stop.

17 Claims, 15 Drawing Sheets

OTHER PUBLICATIONS

Drawings of HTH622B Delimb System (2 pages)(2007).
Pictures of HTH622B Delimb System (4 pages)(prior art before Jun. 12, 2007).
HTH622B Harvesting Head Picture (2 pages)(prior art before Jun. 12, 2009).
HTH624C Product Brochure (3 pages)(prior art before Jun. 12, 2009).
Images of HTH624C Harvesting Head (5 pages)(prior art before Jun. 12, 2009).
HTH626 Product Brochure (2 pages)(2001).
HTH600 Series Product Brochure (12 pages)(Sep. 2007).
TimberRite Product Brochure (6 pages)(Aug. 2008).
Valmet Product Brochure (2 pages)(Nov. 2007).
Image of Valmet Product (1 page)(May 2009).
Ponsse Product Brochure (2 pages)(2005).
Examination Report from Intellectual Property Office of New Zealand for Counterpart New Zealand Patent Application (2 pages)(Jun. 10, 2010).

* cited by examiner

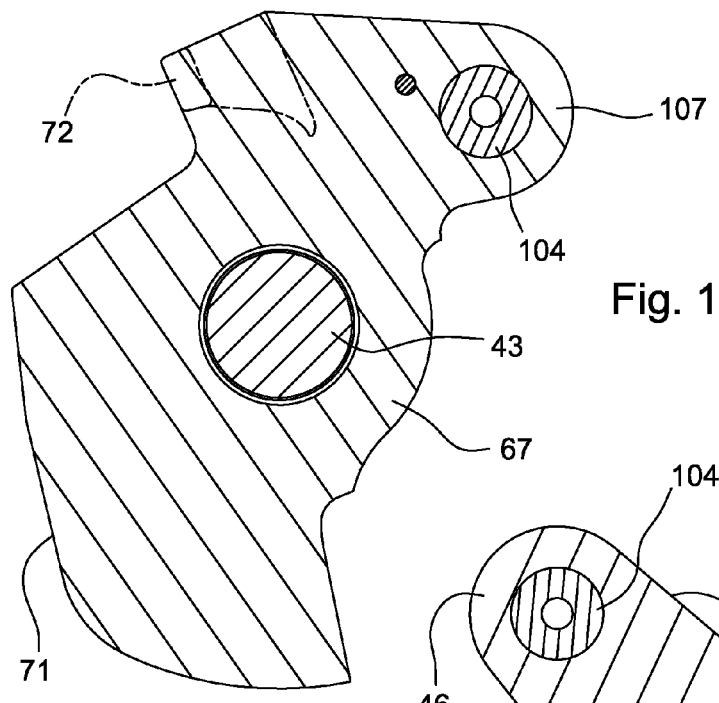
Fig. 16
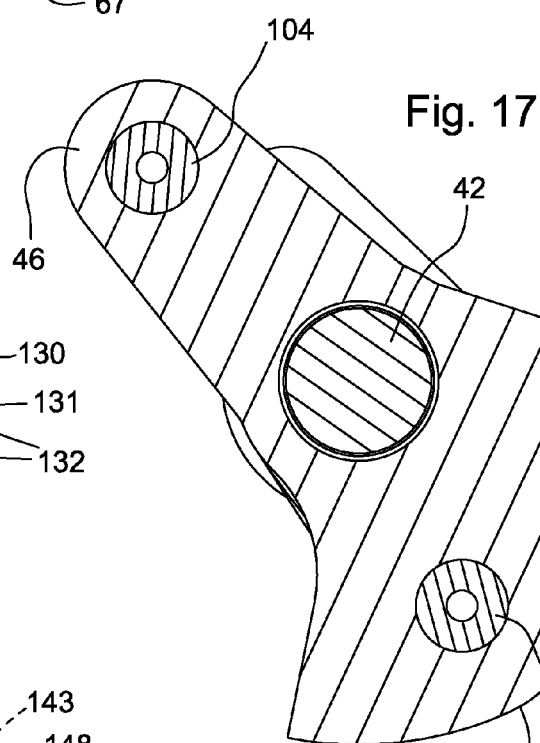
Fig. 17
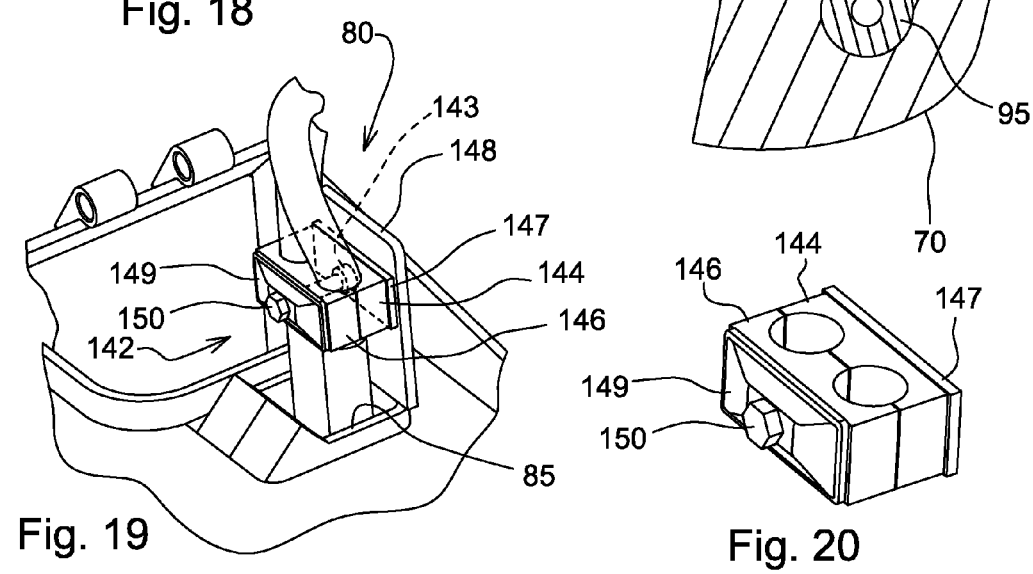
Fig. 18
Fig. 19
Fig. 20

DELIMB ARM CAM STOP

FIELD OF THE DISCLOSURE

The present disclosure relates to a timber-working head, and, more particularly, to delimb arms of the timber-working head.

BACKGROUND OF THE DISCLOSURE

It is well-known to mount a timber-working head in the form of a harvesting head to a carrier to perform a number of functions in connection with timber. For example, the head may be used to grapple and fell a standing tree and process the felled tree by delimbing, possibly debarking (depending on the configuration of the head), and cutting a trunk of the tree into logs (e.g., logs of predetermined length). Processing the felled tree typically involves feeding the felled tree in axially opposite directions, as needed, along a feed axis while delimbing the tree using a number of delimb elements such as one or more delimb arms grappling the tree.

A well-known type of delimb system has a left-hand (LH) delimb arm and a right-hand (RH) delimb arm, both of which are pivotally coupled to a frame of the head. A single hydraulic delimb cylinder is operatively coupled to both delimb arms to pivot the delimb arms relative to the frame so as to open and close them. A timing link interconnects the delimb arms so that they open and close together, preventing independent movement of the delimb arms relative to one another. Such coordinated movement of the delimb arms is useful, for example, to facilitate picking up logs from a stack but is less suitable with ill-formed trees such as those with sweep (i.e., variation in the axial linearity of the tree) or other contour irregularities (e.g., bulges, depressions, lack of circularity).

SUMMARY OF THE DISCLOSURE

According to an aspect of the present disclosure, there is provided a timber-working head. The head comprises a frame, first and second delimb arms pivotally coupled to the frame, and a single delimb cylinder operatively coupled to both the first delimb arm and the second delimb arm to pivot the first and second delimb arms relative to the frame to open and close them. The first and second delimb arms are otherwise operatively unconnected from one another allowing pivotal movement of each of the first and second delimb arms without corresponding pivotal movement of the other of the first and second delimb arms. The second delimb arm comprises a cam stop defining a variable closure point for the first delimb arm, and the first delimb arm is configured to pivot into closed engagement with the cam stop.

The cam stop may be used to prevent the first delimb arm from hitting a length-measurement wheel of the head. The wheel is coupled to a pivot arm so as to be pivotable toward and away from a torso of the frame to follow a contour of the timber (i.e., a tree or log whether delimbed or undelimbed and debarked or undebarked) held by the head as the timber is advanced through the head. The wheel is positioned in an operational plane of a grapple of the first delimb arm. The grapple of the first delimb arm is closable against the cam stop such that the cam stop spaces the grapple apart from the length-measurement wheel, and the cam stop is configured to do so when the wheel is fully extended away from the torso or retracted to a position closer to the torso.

The first delimb arm may also have a cam stop, in which case the cam stop of the first delimb arm can be called a first cam stop and the cam stop of the second delimb arm can be called a second cam stop. The grapple of the first delimb arm is closable against the second cam stop when the second delimb arm is positioned in opened or closed positions. Similarly, the grapple of the second delimb arm is closable against the first cam stop when the first delimb arm is positioned in opened or closed positions. The cam stops may be similarly shaped so that the grapples of the delimb arms are able to close to a same or similar extent as one another.

The delimb arms are thus able to accommodate sweep and other contour irregularities in the timber. The cam stops provide an effective limit to closure of the delimb arms.

The above and other features will become apparent from the following description and the attached drawings.

BRIEF DESCRIPTION OF THE DRAWINGS

The detailed description of the drawing refers to the accompanying figures in which:

FIG. 16 is a sectional view taken along lines 16-16 of FIG. 6A;

FIG. 17 is a sectional view taken along lines 17-17 of FIG. 8A;

FIG. 18 is an elevation view of an alternative detail;

FIG. 19 is a perspective view showing a hose clamp for the delimb cylinder hosing (i.e., the supply hose and the return hose); and FIG. 20 is a perspective view of the hose clamp.

DETAILED DESCRIPTION OF THE DRAWINGS

Figure 1:
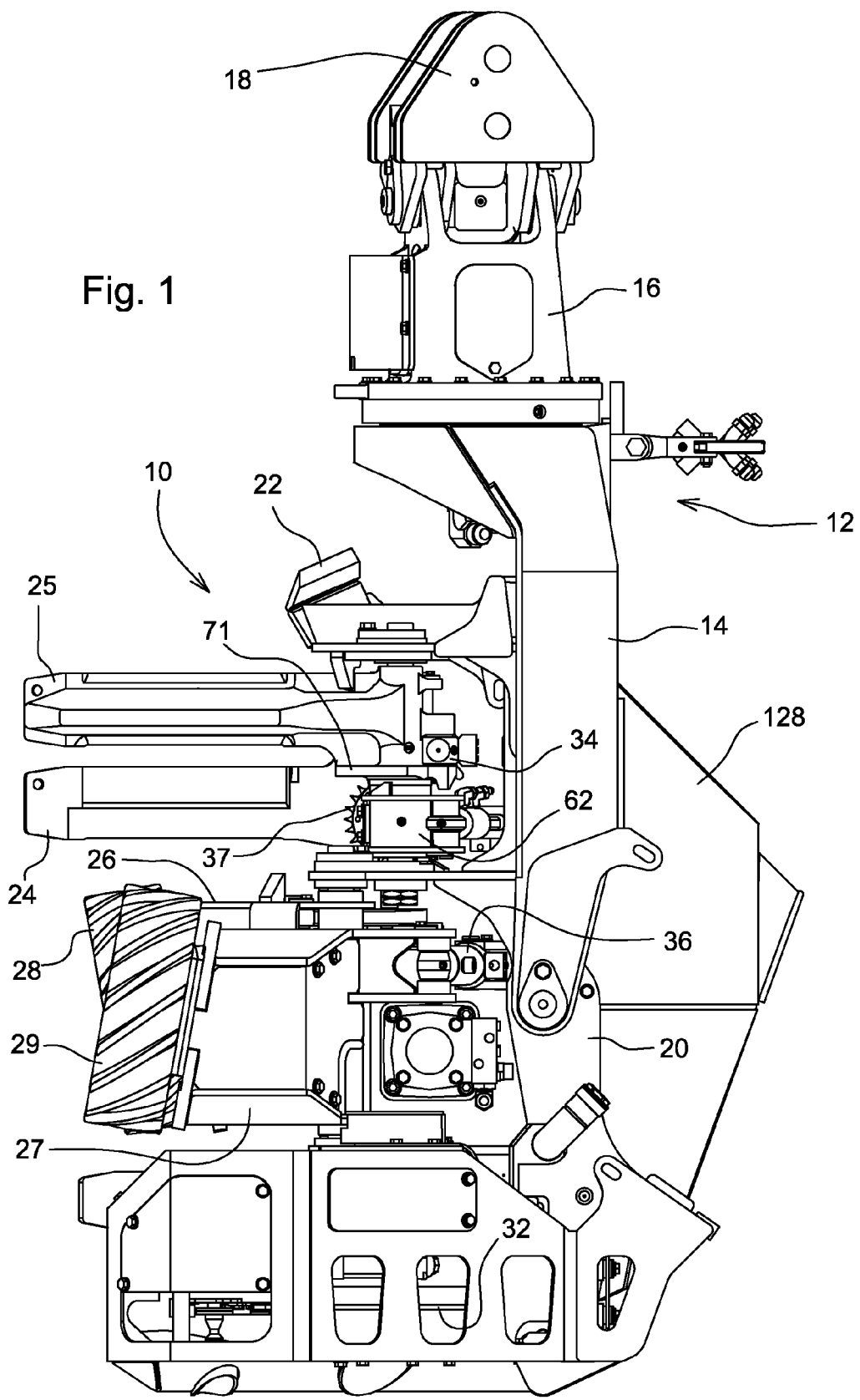
FIG. 1 is a side elevation view of a timber-working head in the form of, for example, a harvesting head.

Referring to FIG. 1, there is shown a timber-working head 10. The head 10 is illustrated, for example, as a harvesting head capable of grappling, felling, delimbing, and cutting a tree into one or more logs of predetermined length. It may also be configured to debark the tree or logs thereof.

The head 10 is coupleable to the boom (articulated or non-articulated) or other support structure of a carrier, using, for example, a hanger 12, for manipulation by an operator located in an operator's station of a base machine of the carrier. The hanger 12 may have a hanging bracket 14 to which the head 10 is coupled for pivotal movement between a generally upright, harvesting position for felling a tree and a generally prone, processing position for processing the felled tree (e.g., delimbing, debarking, cutting to length) or other timber, a hydraulic rotator 16 coupled to the hanging bracket 14 for rotating the head 10 and bracket 14, and a joint 18 interconnecting the rotator 16 and the boom. The head 10 is designed to pivot under its own weight, or its own weight plus that of a felled tree if it has just felled a tree, from the harvesting position to the processing position. A hydraulic cylinder (not shown) extending between and coupled to the head 10 and the hanging bracket 14 on the opposite side of the head 10 from what is shown in FIG. 1 is configured to pivot the head 10 back to the harvesting position.

Figure 2:
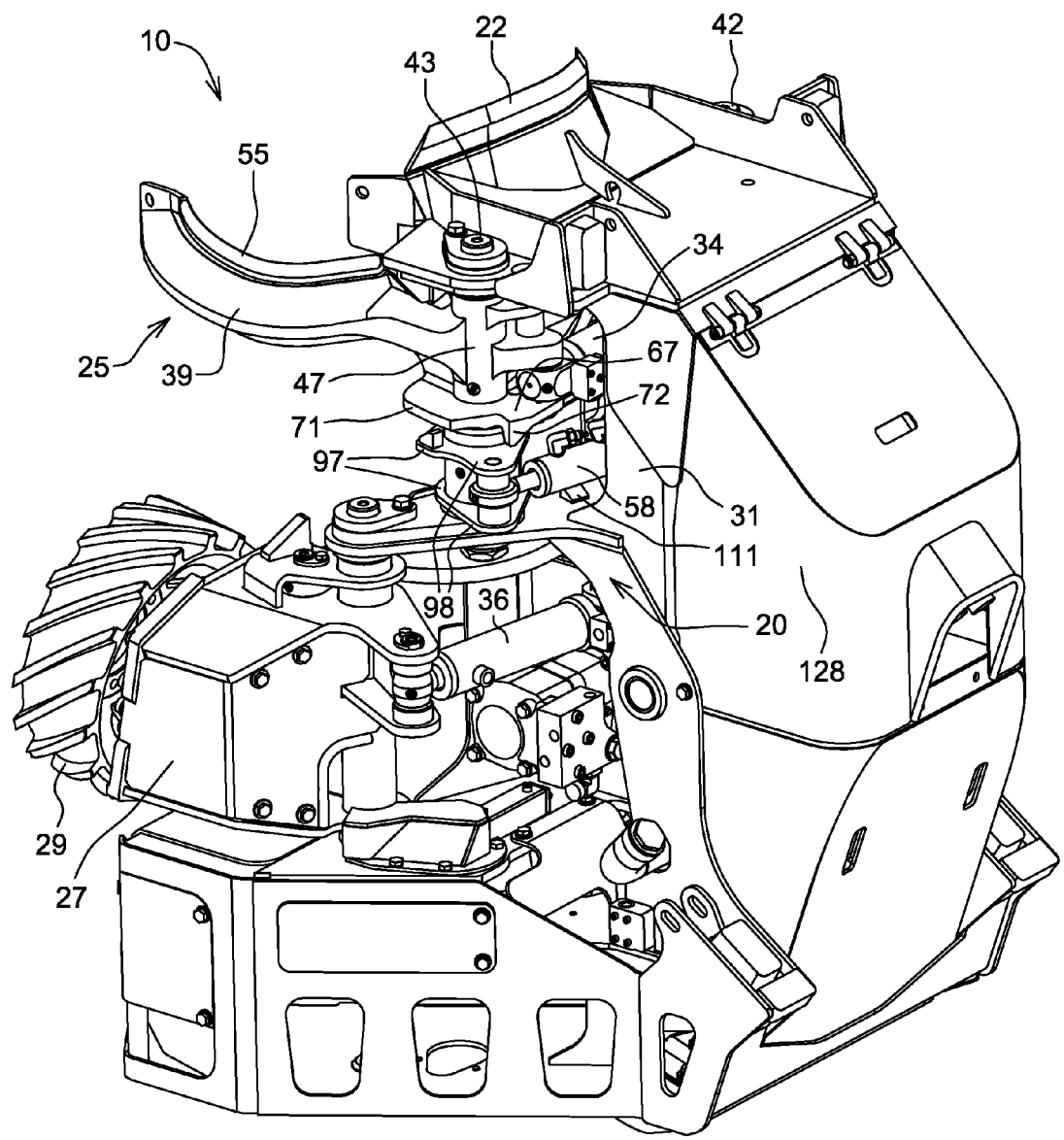
FIG. 2 is an perspective view of the head.
Figure 3:
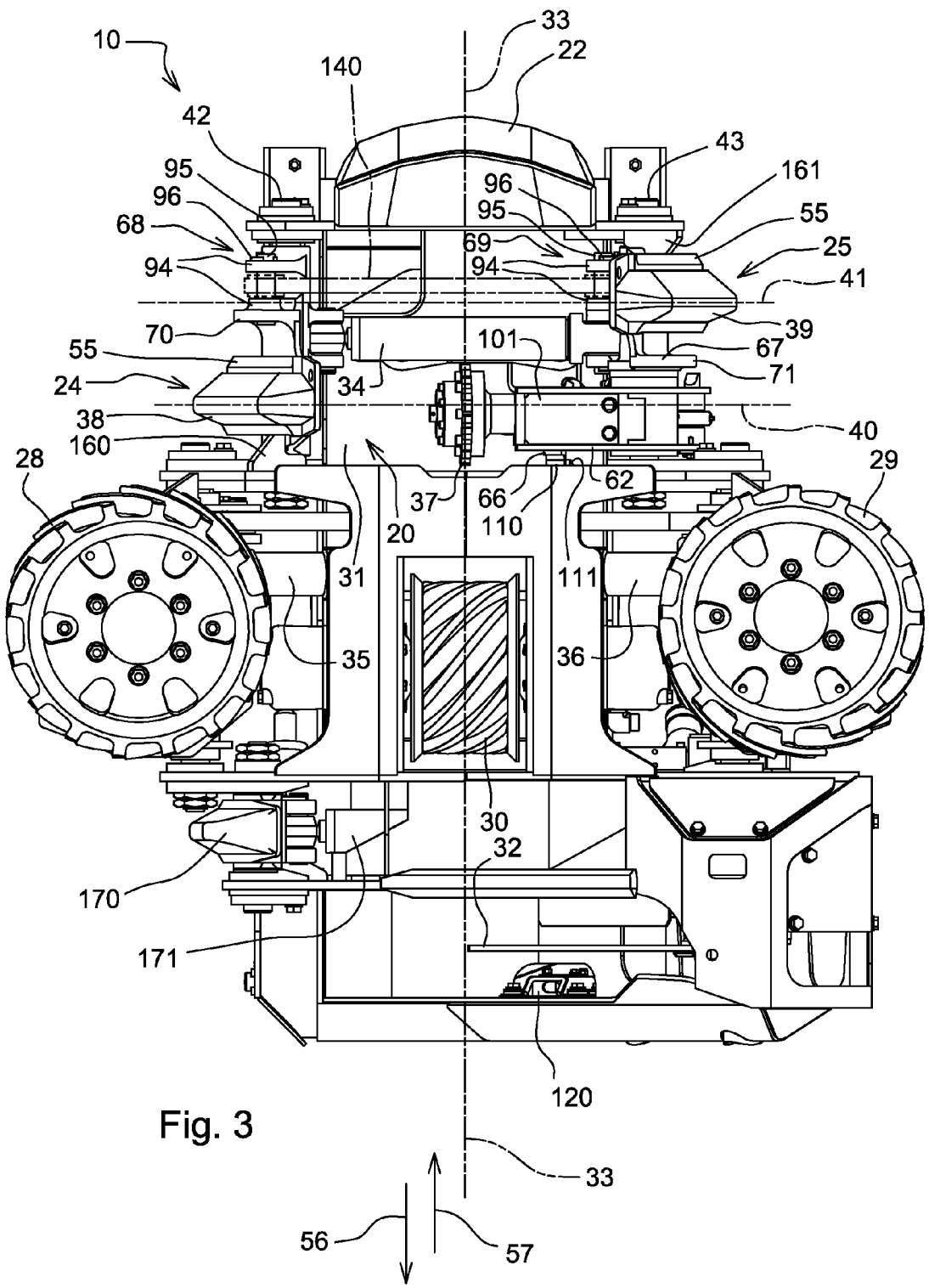
FIG. 3 is a front elevation view of the head.

Referring to FIGS. 2 and 3, exemplarily, the head 10 has a frame 20 configured, for example, as a weldment suitable for use as a harvesting head, a stationary delimb knife 22, a first or right-hand (RH) delimb arm 24, a second or left-hand (LH) delimb arm 25, a first or RH feed arm 26 (shown in part in FIG. 1 and similar to LH feed arm 27 but configured for RH side), a second or LH feed arm 27, a first or RH arm-mounted feed wheel 28, a second or LH arm-mounted feed wheel 29, a frame-mounted feed wheel 30, a foiling saw 32, and a number of other components including a valve block mounted to the rear side of a torso or body back 31 of the frame 20 and covered by a valve cover 128, various hydraulic cylinders, hydraulic motors, electrical lines and hoses (not shown except for delimb cylinder hosing shown in other drawings), sensors, etc.

The stationary delimb knife 22 is welded to the top of the frame 20 and is configured to delimb timber held by and translated along a feed axis 33 of the head 10. The knife 22 can be replaced by cutting the weld and welding a fresh knife to the frame 20. In other embodiments, the knife 22 may be mounted to the frame 20 for movement relative thereto along a guide toward and away from timber held by the head 10 so as to float on and thus follow the timber. When the head 10 is oriented in its processing position, movement of the floating knife toward the timber may occur under the force of gravity and movement away from the timber may occur due to changes in the shape of the timber. Such a configuration of the knife 22 may be particular useful with soft wood.

The two delimb arms 24, 25 are pivotally coupled to the frame 20 to open and close relative thereto using a single hydraulic cylinder 34. They are configured to embrace and delimb the timber upon translation of the timber within the head 10 along the feed axis 33. The head 10 may also have a lower delimb arm 170 (FIG. 3) pivotally coupled to the frame 20 to open and close relative thereto using a hydraulic cylinder 171 coupled to the frame 20 and the lower delimb arm 170.

The feed arms 26, 27 are pivotally coupled to the frame 20 to open and close relative thereto using respective hydraulic cylinders 35, 36. The feed wheels 28, 29 are coupled respectively to the ends of the feed arms 26, 27 so as to be carried thereby for pivotal movement relative to the frame 20 to embrace and release the timber. The feed wheel 30 is mounted to the torso 31 of the frame 20 such that its rotation axis is stationary relative to the frame 20.

During a felling operation, the operator maneuvers the head 10 into proximity to a standing tree and embraces the tree with delimb arms 24, 25 and the feed arms 26, 27/feed wheels 28, 29. The felling saw 32, configured as a chain saw (saw bar shown but not chain), is actuated so as to cut through and fell the tree. While holding the felled tree, the head 10 pivots from its harvesting position to its processing position for processing. Skilled operators sometimes begin processing as the felled tree is falling.

During processing, the felled tree may then be translated in opposite first and second directions along the feed axis 33. To do so, the feed wheels 28, 29, 30 are driven hydraulically in corresponding directions. During such translation, the stationary delimb knife 22 and delimb arms 24, 25 delimb the tree, and the tree may also be debarked by use of well-known debarking techniques, illustratively by use of debarking-type wheels for the feed wheels 28, 29, 30 and/or opposite angling of the wheels 28, 39, relative to the frame 20 to add rotation to the tree.

Once the tree has been sufficiently delimbed and debarked, as applicable, the operator may wish to cut the tree into logs of predetermined length. A photosensor 120 (e.g., photocell), located at the felling saw end of the head 10 a short distance axially offset from the saw 32, is configured to sense the butt end of the tree to define the initial datum point from which to start measuring the predetermined length of the first log (accounting for the axial offset between the photosensor 120 and the saw 32 in the control software). A toothed length-measurement wheel 37 of the head 10 engages the surface of the tree and rotates against the tree upon feeding of the tree along the feed axis 33, and rotation of the wheel 37 is sensed and used to determine timber length in a well-known manner. When the tree has been fed the predetermined length, the saw 32 is activated to cut the first log from the tree. Depending on the available length of the tree, subsequent logs may be cut from the tree in the same manner.

In other operations, the head 10 may be used to process an already-felled tree or logs thereof. The head 10 may also be used to process simultaneously multiple trees or logs of sufficiently small diameter, although processing only one at a time would be more typical.

The single delimb cylinder 34 is operatively coupled to both the RH delimb arm 24 and the LH delimb arm 25 to pivot the delimb arms 24, 25 relative to the frame 20 to open and close them. The delimb arms 24, 25 are otherwise operatively unconnected from one another so as to allow pivotal movement of each of the delimb arms 24, 25 without corresponding pivotal movement of the other of the delimb arms 24, 25. Stated otherwise, the delimb arms 24, 25 are operatively coupled to one another via a single path which comprises the delimb cylinder 34. As such, the delimb system lacks a timing link 140 (shown in phantom in FIGS. 3 and 4) interconnecting the delimb arms 24, 25. Thus, each delimb arm 24, 25 can pivot relative to the frame 20 without corresponding pivotal movement of the other delimb arm 24, 25. It therefore may be said that the delimb arms 24, 25 can pivot independent of one another.

Such independence between the delimb arms 24, 25 allows the delimb arms 24, 25 to accommodate effectively sweep or other contour irregularities in timber grappled by the arms 24, 25. For example, since the grapples 38, 39 of the arms 24, 25 are axially offset relative to the feed axis 33 such that the grapples 38, 39 are pivotable in axially offset operational planes 40, 41 perpendicular to the axis 33, the grapples 38, 39 will encounter an axial portion of the timber at different times. Thus, when there is sweep in the timber, the grapples 38, 39 may want to open or close to different extents in order to maintain contact with the timber. Without the timing link, the grapples 38, 39 are able to do so. On the other hand, if coordinated pivotal movement between the delimb arms 24, 25 is desired, an operator is free to reconnect the timing link 140 to the delimb arms 24, 24. Indeed, it is thought that the usual mode of operation of the head 10 will be to include the timing link 140 on the head 10, but remove it when handling ill-formed timber.

Referring to FIGS. 3-8B, the RH and LH delimb arms 24, 25 are pivotally coupled to the frame 20 using RH and LH pins 42, 43, respectively (pins 42, 43 are made, for example, of high-tensile steel). Each pin 42, 43 is fixed to the frame 20 using a pair of nuts 44 threaded onto the bottom portion of the respective pin 42, 43 (internal threads of nuts 44 and external threads of pins 42, 43 not shown) into engagement with the frame 20 and a teardrop-shaped retainer plate 45 welded to the top portion of the respective pin 42, 43 and bolted to the frame 20 with a threaded bolt 125 (e.g., DIN 912 M16×40 with quality grade 10.9).

In other embodiments, rather than the twin nuts 44, a single-split internally-threaded collar 130 (e.g., from 1040 round steel) may be threaded to the bottom of the respective pin 42, 43, as shown, for example, in FIG. 18. In such a case, a cap screw 131 tightens the collar 130 onto the pin 42, 43 by drawing the ends of the collar 130 toward one another (internal threads of collar 130, external threads of pins 42, 43, and external threads of screw 131 not shown for drawing simplification). Two interlocking DISC-LOCK™ washers 132 are positioned between the head of the screw 131 and a land of the collar 130. The washers 132 have inclined cams on one side face and a series of non-slip ridges on the other. On installation the two cam side faces are mated together and placed between the head of the screw 131 and the land of the collar 130. Under vibration the screw 131 may attempt to rotate loose but, as the angle of the cams is greater than the pitch angle of the thread on the screw 131, the interlocking cams and the non-slip ridges of the washers 132 work together to create a jamming effect. This effect prevents loosening and further locks the assembly, thereby maintaining joint integrity. Such a collar assembly may also be employed on the pins provided for mounting of the feed arms 26, 27 and a lower delimb arm 170, in place of a respective twin-nut arrangement.

The RH and LH delimb arms 24, 25 include RH and LH pivot sleeves 46, 47 and the RH and LH grapples 38, 39, respectively. The pins 42, 43 extend through the pivot sleeves 46, 47, respectively.

Referring to FIG. 6A, a pair of bushings 50 made, for example, of internally lubricated nylon (e.g., NYLOIL®) is positioned between the pivot sleeve 47 and the pin 43 to facilitate rotation of the pivot sleeve 47 about the pin 43 and the pivot axis 65 defined thereby. A grease nipple 151 (FIG. 5) is provided for lubrication (e.g., with grease) of the interfaces between the bushings 50 and the sleeve 47 and between the bushings 50 and the pin 43. Each bushing 50 has an axially central annular groove 156 formed in its outside diameter surface and a number of radial through-holes (e.g., four) spaced circumferentially evenly about the bushing 50 and extending between the annular groove and the inside diameter surface of the bushing 50 to communicate lubricant therebetween for lubrication of the respective interfaces. Thrust washers 51, 135 made, for example, of internally lubricated nylon (e.g., NYLOIL®) are positioned at either end of the pivot sleeve 47. A top-hat thrust washer 52, made, for example, of hardened steel (e.g., typically HRC 40), is positioned at the lower end, contacts the frame 20, and extends through the washer 135 so as to contact the pivot sleeve 47.

At the upper and lower ends of each pin 42, 43, the frame 20 includes, for example, a wing 121 in the form of three hardened steel plates that are profile-cut and welded together into a lamination to increase the length and thus bearing surface of the bore through which the pin 42, 43 extends, to promote pin and bore life. Each of the plates of the wing 121 is a high tensile strength plate which undergoes quenching and tempering as pad of the manufacturing process, resulting in a typical hardness of HRC 30. The wing 121 includes a central main plate and two plates welded to either side of the main plate. With respect to the two upper wings 121, the three plates cooperate to define a bolt-receiving through-hole (e.g., 50 mm long), a portion of which is infernally threaded (e.g., 42 mm measured from top) (threads not shown) to receive the threaded bolt 125 therein.

The length-measurement wheel 37 and a hydraulic wheel cylinder 58 are coupled to the pin 43. An outer pivot sleeve 59 surrounds the pivot sleeve 47, and a bushing 60 made, for example, of internally lubricated nylon (e.g., NYLOIL®) is positioned between the pivot sleeves 47, 59 to facilitate rotation of the two pivot sleeves 47, 59 relative to one another. A grease nipple 152 (FIG. 5) is provided for lubrication (e.g., with grease) of the interfaces between the bushing 60 and the sleeve 58 and between the bushing 60 and the sleeve 47. Each bushing 60 has an axially central annular groove 156 formed in its outside diameter surface and a number of radial through-holes (e.g., four) spaced circumferentially evenly about the bushing 60 and extending between the annular groove and the inside diameter surface of the bushing 60 to communicate lubricant therebetween for lubrication of the respective interfaces. A thrust washer 61 made, for example, of hardened steel (e.g., case-hardened HRC 52-59) spaces the outer pivot sleeve 59 and bushing 60 apart from a radial flange plate 67 of the delimb arm 25 extending radially outwardly from the pivot sleeve 47. The wheel 37 is rotatably coupled in a well-known manner to a well-known pivot arm 62 fixed to the outer pivot sleeve 59 against movement relative thereto (such fixation being well-known). The portion of the outer surface of the pivot sleeve 47 along which the bushing 60 extends may be machined, while the outer surface of the pivot sleeve 47 on the other side of the flange plate 67 may not be machined.

The wheel cylinder 58 is coupled at one end to the torso 31 of the frame 20 and an opposite end to the pivot arm 62. The pivot arm 62 includes a pair of radial flange plates 97 welded to the outer pivot sleeve 59 and to which the main elongate section 101 of the pivot arm 62 is coupled. Each flange plate 97 includes an ear 98 receiving a pin 99 to which an end of the cylinder 58 is pivotally coupled. A pin retainer 100 includes a retainer plate interfacing with the pin 99 to block axial movement of the pin 99 out of the ears 98 and a threaded bolt coupling the retainer plate to one of the ears 98. A mild steel spacer, positioned between each ear 98 and the eye of the cylinder 58 is welded to that ear, and a mild steel thrust washer is positioned between that spacer and a spherical bushing retained within the eye of the cylinder 58 (there are thus two such mild steel spacers and two such mild steel thrust washers).

A grease nipple 157 is provided for lubrication (e.g., with grease) of the interfaces between the eye and the spherical bushing, between the spherical bushing and the pin 99, and between components of the spherical bushing. The spherical bushing has a metallic outer component, with a concave inner diameter surface, and a metallic inner component, with a convex outer diameter surface, received in the outer component, each component having an axially central annular groove formed in its outside diameter surface and a number of radial through-holes (e.g., two) spaced circumferentially evenly about the component and extending between the annular groove and the inside diameter surface of the component to communicate lubricant therebetween for lubrication of the respective interfaces. The spherical bushing is retained within the eye of the cylinder 58 by use of a radially inwardly extending lip formed on the right side of the inner diameter surface of the eye (as viewed in FIG. 6A) for engagement with the outer component of the spherical bushing and a retaining ring (e.g., circlip) received in an annular groove formed in the left side of the inner diameter surface of the eye (as viewed in FIG. 6A) for engagement with the other side of the outer component of the spherical bushing.

Actuation of the wheel cylinder 58 rotates the outer pivot sleeve 59 about the pin 43 to pivot the pivot arm 62 and thus the wheel 37 about the pin 43 and the pivot axis 65 defined thereby. A pivot arm stop 66 (FIG. 9) is welded to the main elongate section 101 of the pivot arm 62 in a well-known manner. The stop 66 has opposite surfaces (top and bottom as viewed in FIG. 9) configured to contact respective portions of the frame 20 to limit extension and retraction of the wheel 37 relative to the torso 31 between a fully extended position in which the bottom surface engages a stop 110 of the frame 20 (FIG. 3), the stop 110 being welded to a plate of the frame 20 in a well-known manner, and a fully retracted position in which the top surface engages a stop 111 of the frame 20 (FIG. 3), the stop 111 being welded to a plate of the frame 20 in a well-known manner.

The wheel cylinder 58 may be used to extend and retract the wheel 37 according to any suitable control scheme. For example, the wheel cylinder 58 may retract the wheel 37 to its fully retracted position when the delimb arms 24, 25 and feed arms 26, 27 are opened. Also, an operator can press a button at the operator's station of the base machine to cause the cylinder 58 to retract the wheel 37 to its fully retracted position at any time. When felling a tree, the cylinder 58 may retract the wheel 37 to its fully retracted position.

The cylinder 58 may be activated to urge the wheel 37 away from the torso 31 toward the fully deployed position to engage timber when the delimb arms 24, 25 and feed arms 26, 27 are closed (i.e., when the operator activates the close button at the operator's station or other input device) or when a reference cross cut is being used. With respect to the reference cross cut, the cylinder 58 may be activated to urge the wheel 37 away from the torso 31 toward the fully deployed position when the saw 32 is activated to cross-cut timber during processing or when the photosensor 120 senses an end of the timber (e.g., automatically or in response to activation of a find-end button or other input device). In both such cases (i.e., saw cut or find end), the timber length which may be stored in memory is readied to receive a new length measurement. The cylinder 58 may also urge the wheel 37 into engagement with the timber during feeding of the timber.

Referring to FIG. 8A, a pair of bushings 48 made, for example, of internally lubricated nylon (e.g., NYLOIL®) is positioned between the pivot sleeve 46 and the pin 42 to facilitate rotation of the pivot sleeve 46 about the pin 42 and the pivot axis 64 defined thereby. A grease nipple 154 (FIG. 7) is provided for lubrication (e.g., with grease) of the interfaces between the bushing 48 and the sleeve 46 and between the bushings 48 and the pin 42. Each bushing 48 has an axially central annular groove 156 formed in its outside diameter surface and a number of radial through-holes (e.g., four) spaced circumferentially evenly about the bushing 48 and extending between the annular groove and the inside diameter surface of the bushing 48 to communicate lubricant therebetween for lubrication of the respective interfaces. Thrust washers 49 made, for example, of internally lubricated nylon (e.g., NYLOIL®) are positioned at either end of the pivot sleeve 46.

Figure 4:
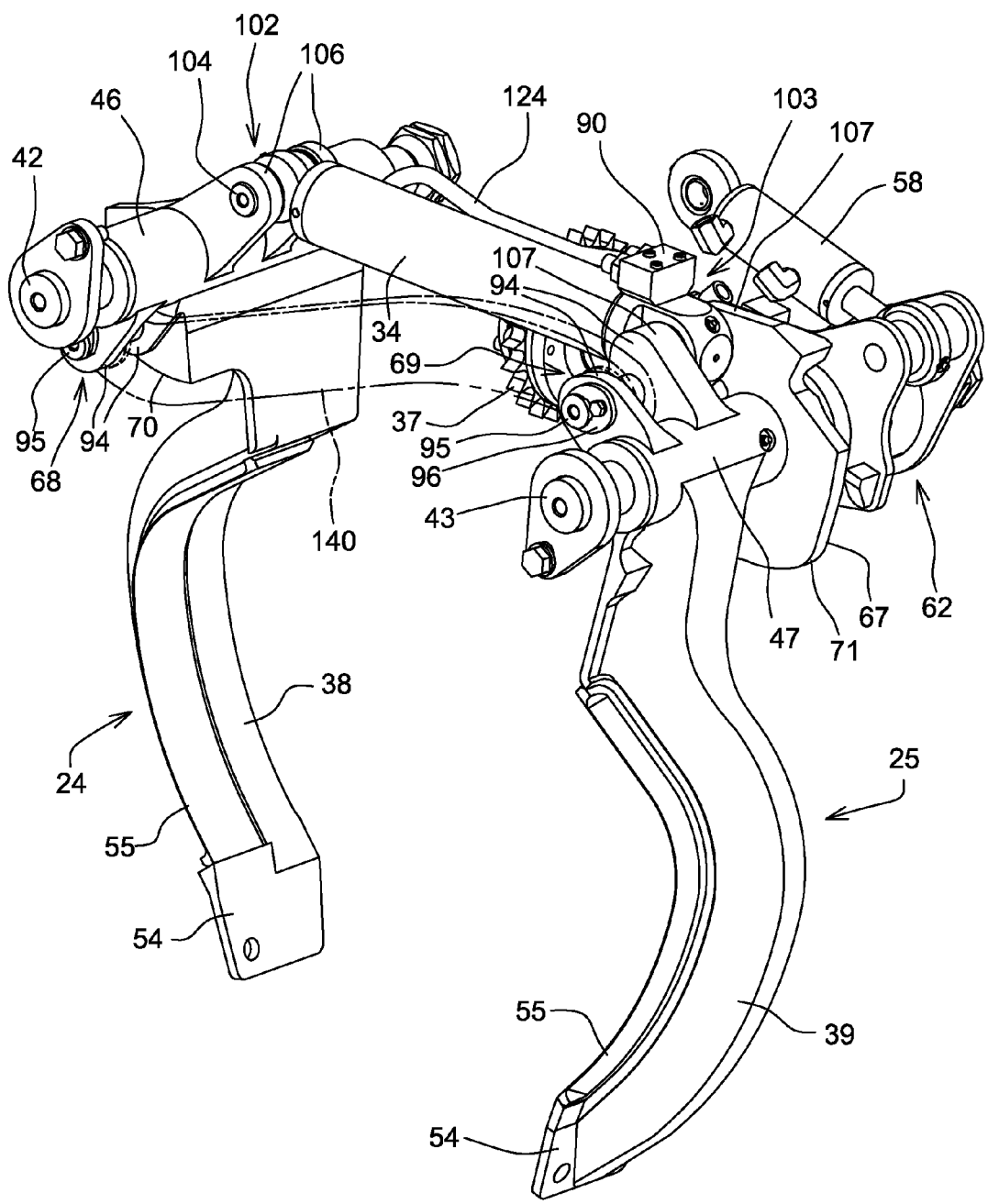
FIG. 4 is perspective view showing a delimb system and a length-measurement system of the head, the delimb system having a left-hand (LH) delimb arm and a right-hand (RH) delimb arm, the length-measurement system having a length-measurement wheel for measuring length of timber held by the head.
Figure 5:
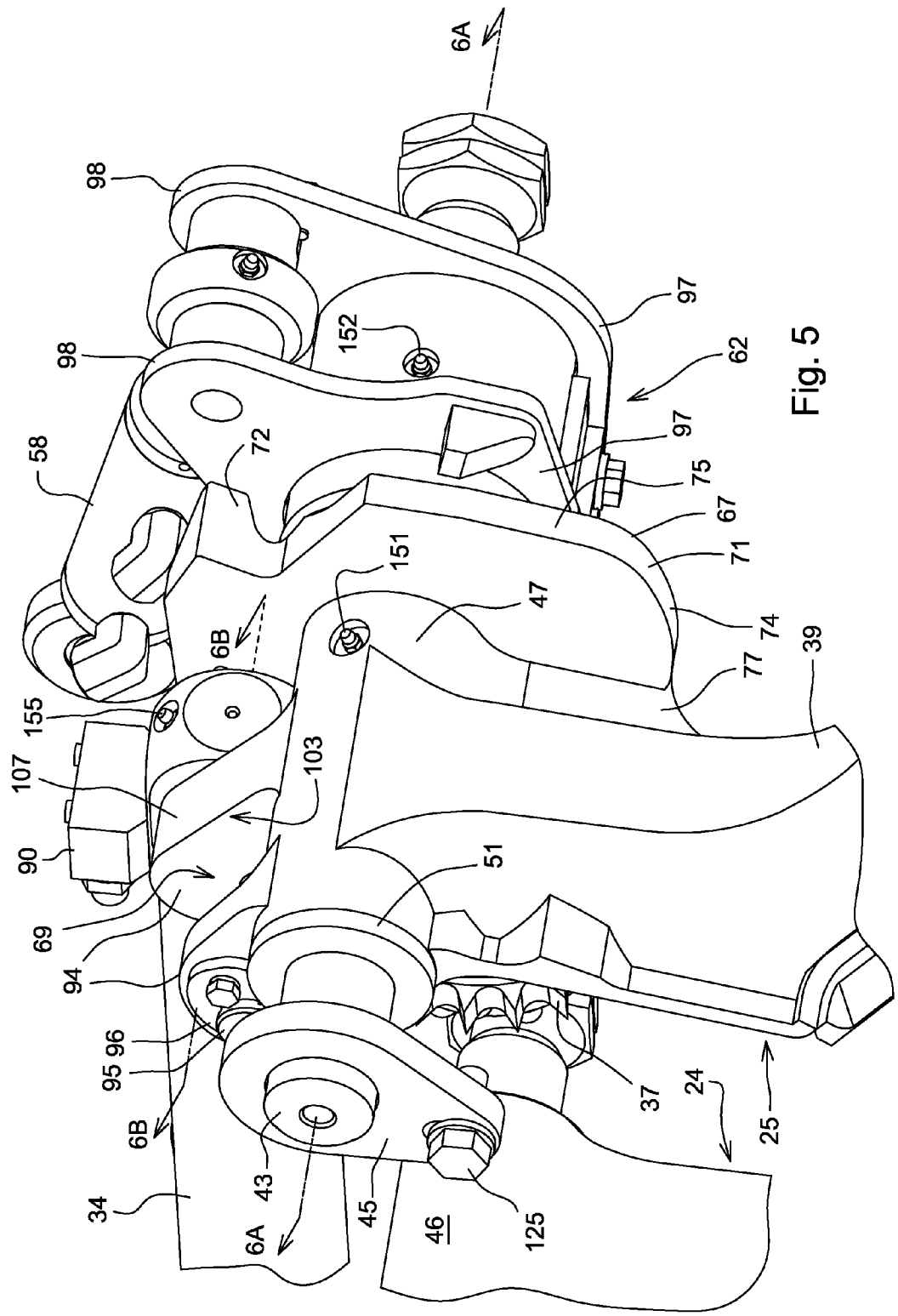
FIG. 5 is an enlarged perspective view, with portions broken away, showing a LH cam stop of the LH delimb arm defining a variable closure point for the RH delimb arm.
Figure 6:
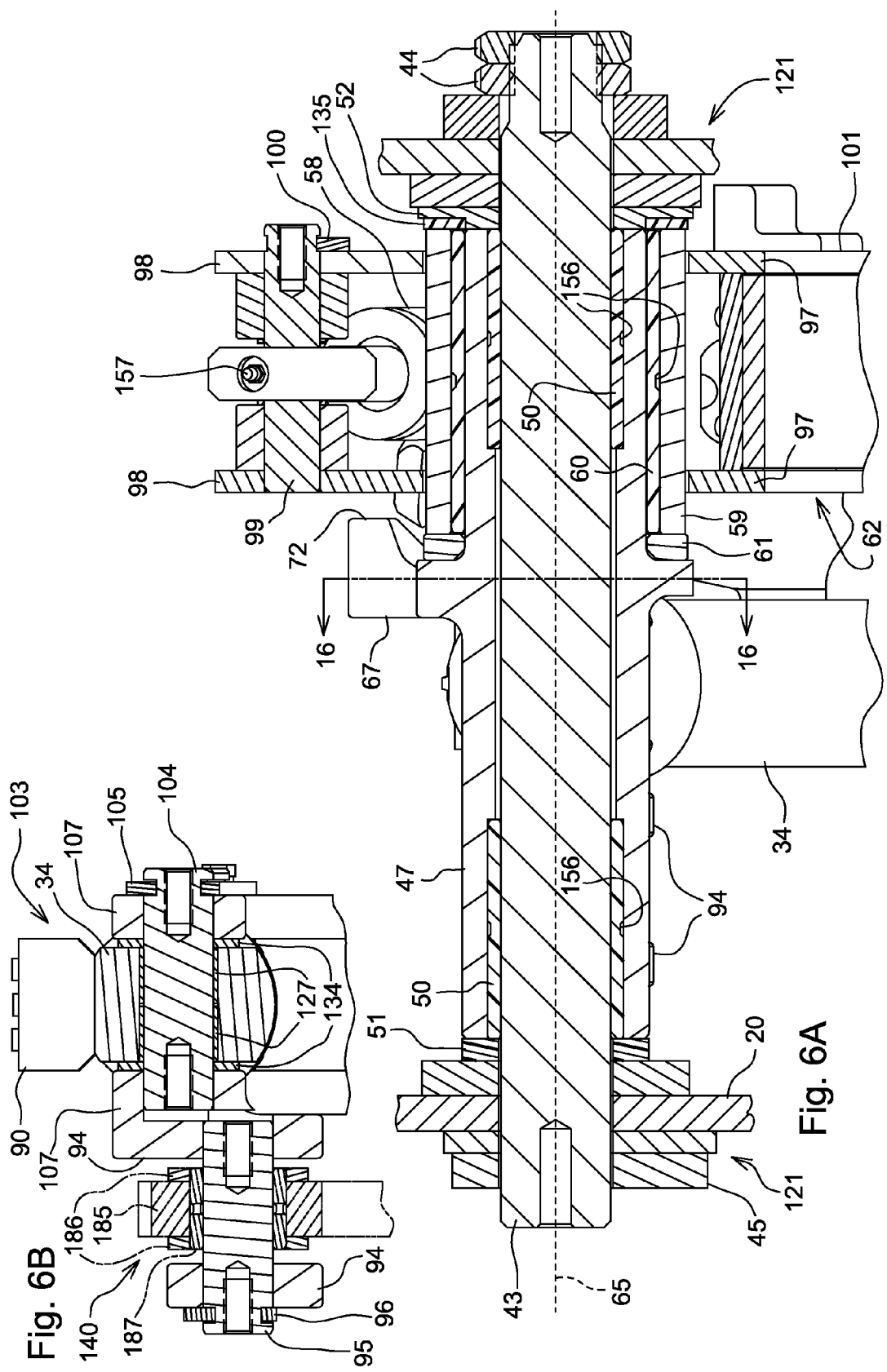
FIG. 6A is a sectional view taken along lines 6A-6A of FIG. 5.
FIG. 6B is a sectional view taken along lines 6B-6B of FIG. 5.
Figure 7:
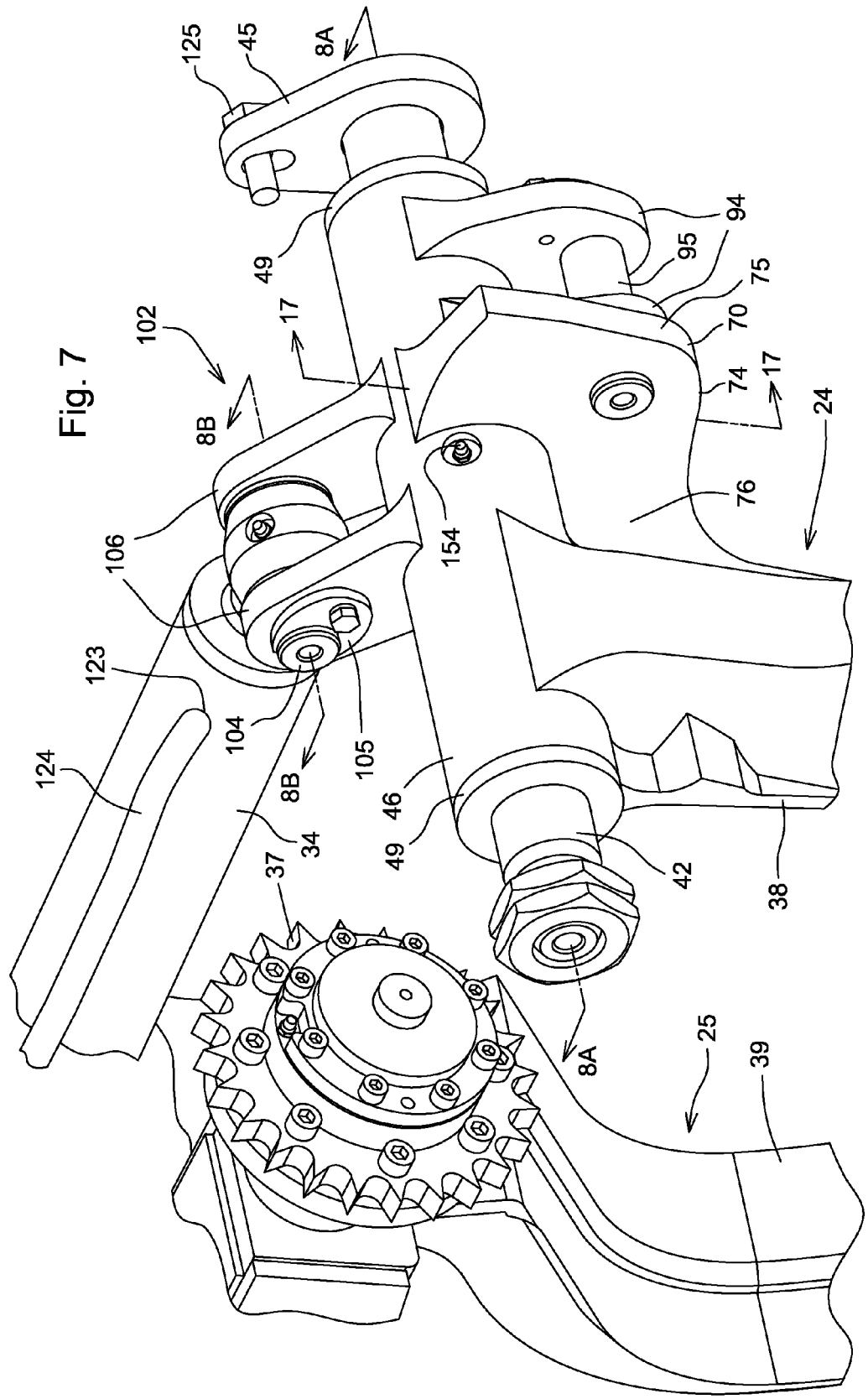
FIG. 7 is an enlarged perspective view, with portions broken away, showing a RH cam stop of the RH delimb arm defining a variable closure point for the LH delimb arm.
Figure 8:
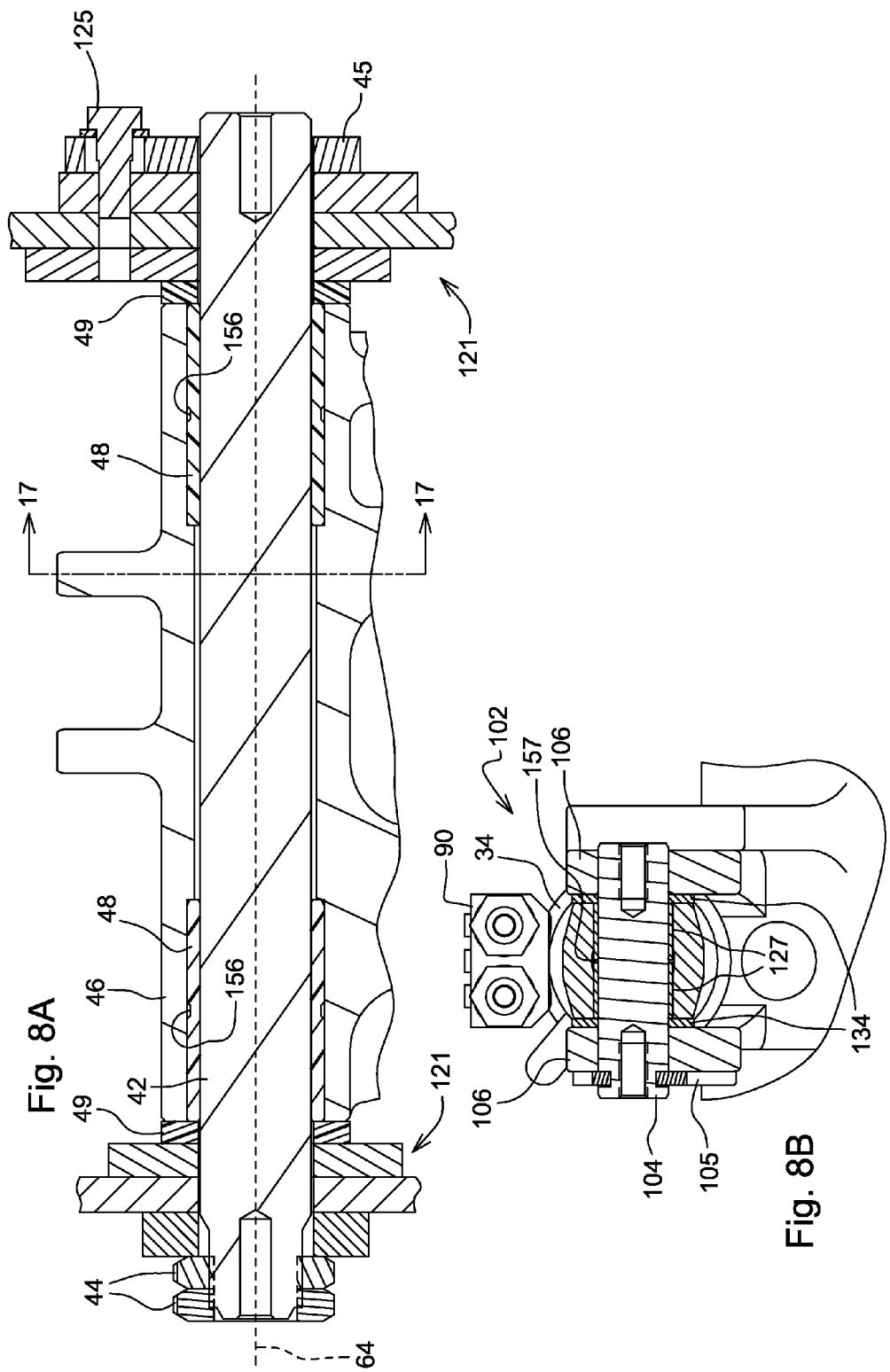
FIG. 8A is a sectional view taken along lines 8A-8A of FIG. 7.
FIG. 8B is a sectional view taken along lines 8B-8B of FIG. 7.

Each grapple 38, 39 includes a bar 54 integral with the respective pivot sleeve 48, 47 and a knife insert 55 welded to the bar 54, as shown, for example, in FIG. 4. When worn, the knife insert 55 can be replaced with a fresh knife insert. Most, if not all, of the delimbing will occur as the timber is driven in a direction 56 along the feed axis 33 (FIG. 3). The knife inserts 55 thus perform much of the delimbing done by the delimb arms 24, 25. The bar 54 has a knife edge cast into it on the opposite side of the knife insert 55 to delimb the timber as the timber is driven in the opposite, direction 57 (FIG. 3). Other than the knife inserts 55, the RH and LH delimb arms 24, 25 may be configured, for example, as steel castings.

RH and LH timing link mounts 68, 69 may be used to mount the timing link 140 to the delimb arms 24, 25, respectively, if desired. Each timing link mount 68, 69 may be configured as a clevis including a pair of ears 94, a pin 95 received by the ears 94, and a pin retainer 98 including a retainer plate interfacing with the pin 95 to block axial movement of the pin 95 out of the ears 94 and a threaded bolt coupling the retainer plate to one of the ears 94. The ears 94 are coupled to the respective pivot sleeve 46, 47 and are, for example, integral with that pivot sleeve 46, 47 as part of the casting of the respective delimb arm 24, 25. The pin 95 and pin retainer 96 may be coupled to the ears 94 even if the timing link 140 is omitted from the head 10 to ensure bores and threads remain clean and undamaged.

The timing link 140 may include a bar 185 (i.e., the main portion of the timing link 140) and two annular bosses 186 welded to each end of the bar 185 on either side thereof such that the bar end and the bosses welded thereto cooperate to define a pin bore receiving a respective pin 95 therethrough, as shown, for example, in FIG. 6B. A bushing 187 (e.g., made of aluminum bronze alloy 954) is positioned in the pin bore along the length thereof to facilitate rotation of the timing link 140 about the pin 95. A grease nipple is coupled to each bar end for lubrication (e.g., with grease) of the interfaces between the bushing and the pin bore and between the bushing and the pin 95. The bushing has an axially central annular groove formed in its outside diameter surface and in its inner diameter surface and a number of radial through-holes (e.g., four) spaced circumferentially evenly about the bushing and extending between the annular grooves to communicate lubricant therebetween for lubrication of the respective interfaces.

Referring to FIGS. 6B and 6B, RH and LH delimb cylinder mounts 102, 103 are configured to mount the ends of the delimb cylinder 34 to the delimb arms 24, 25, respectively. Each mount 102, 103 is configured as a clevis including a pair of ears, a pin 104 received by the ears, and a pin retainer 105 including a retainer plate interfacing with the pin 104 to block axial movement of the pin 104 out of the ears and a threaded bolt coupling the retainer plate to one of the ears. The ears of the RH mount 102 are identified by 106, as shown, for example, in FIG. 8B. The ears of the LH mount 103, shown, for example, in FIG. 6B, are provided by an ear 107 of the flange plate 67 and an opposite ear 107 which together with an ear 94 of the LB timing link mount 69 provides an enlarged ear of the LH mount 103. The ears 106, 107 are coupled to the respective pivot sleeve 46, 47 and are, for example, integral with that pivot sleeve 46, 47 as part of the casting of the respective delimb arm 24, 25.

The eyes at opposite ends of the delimb cylinder 34 are pivotally coupled respectively to the pins 104. With respect to each eye, a pair of bushings 127 (e.g., made of mild steel and case-hardened to HRC 59-64) is positioned between the eye and the pin 104 to facilitate relative rotation between the eye and the pin 104. A grease nipple 155 (FIG. 5) is provided for lubrication (e.g., with grease) of the interfaces between the bushings 127 and the eye and the bushings 127 and the pin 104. An axial space between the bushings 127 allows communication of lubricant between the respective interfaces. A number of mild steel thrust washers 134 (e.g., of same or different thicknesses) may be positioned on either side of the eye to position the eye suitably (e.g., the thrust washers 134 may be selected from a package of three such washers of 2, 3, and 4 millimeter thicknesses).

Referring to FIGS. 9-12, 16, and 17, the RH and LH delimb arms 24, 25 include RH and LH cam stops 70, 71, respectively. The RH cam stop 70 defines a variable closure point for the LH delimb arm 25, and the LH delimb arm 25 is configured to pivot into closed engagement with the RH cam stop 70. The LH cam stop 71 defines a variable closure point for the RH delimb arm 24, and the RH delimb arm 24 is configured to pivot into closed engagement with the LH cam stop 71.

The LH cam stop 71 is configured to prevent the RH delimb arm 25 from hitting the length-measurement wheel 37 since the wheel 37 is positioned in the operational plane 40 of the RH grapple 38. The wheel 37 is coupled to the pivot arm 62 (in a well known manner) so as to be pivotable toward and away from the torso 31 to follow the contour of the timber held by the head 10 as the timber is advanced through the head 10. The RH grapple 38 is closable against the LH cam stop 71 such that the LH cam stop 71 spaces the RH grapple 38 apart from the wheel 37. The LH cam stop 71 is configured to do so throughout the range of pivot motion of the wheel 37 relative to the torso 31, such as when the wheel 37 is fully extended away from the torso 31 to a fully extended position shown, for example, in FIG. 9 in which the stop 66 engages the frame 20 or when the wheel 37 is refracted to a position closer to the torso 31 such as the retracted position shown, for example, in FIG. 11 or to other positions between the fully extended and retracted positions, such as shown, for example, in FIG. 10.

Figure 10:
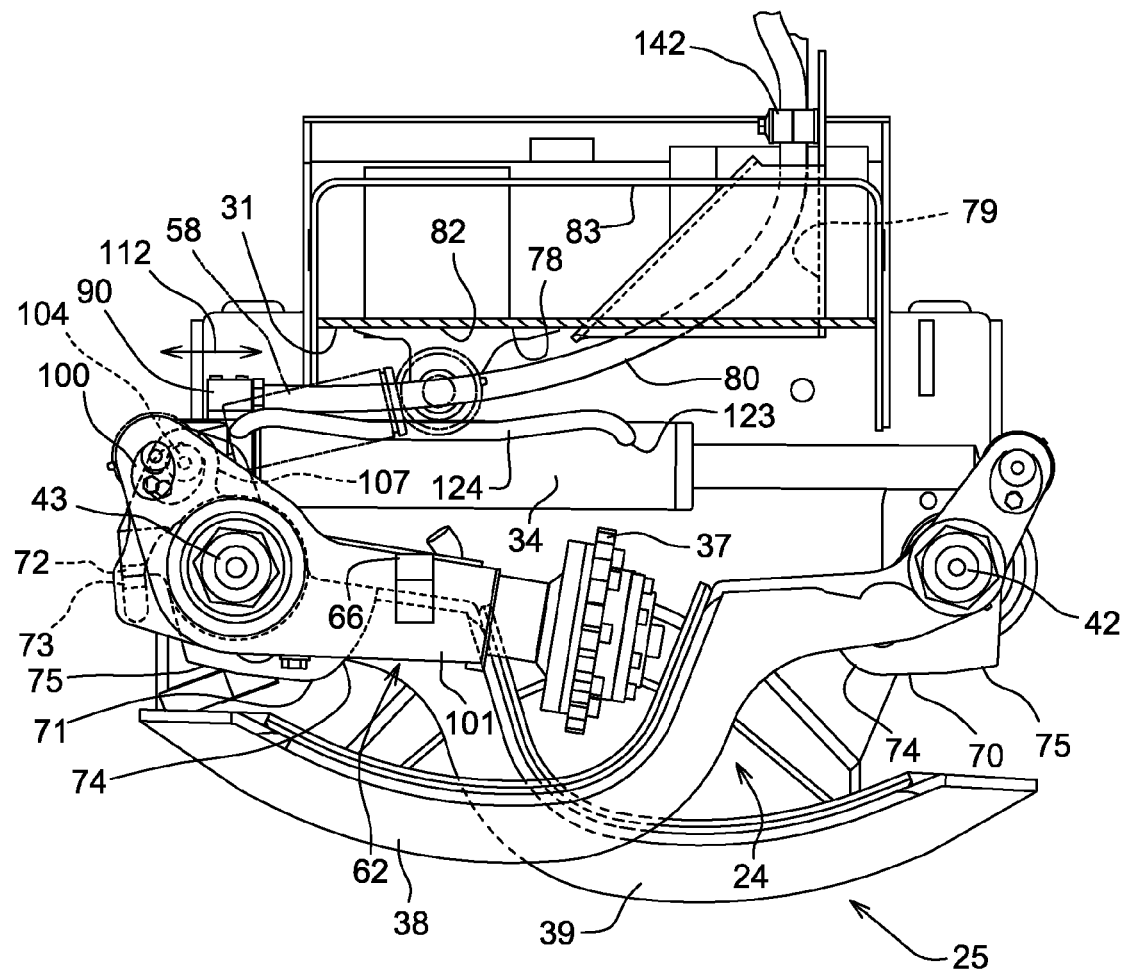
FIG. 10 is an end elevation view showing initial engagement of the LH delimb arm against a pivot arm to which the length-measurement wheel is rotatably coupled to retract the length-measurement wheel away from the fully extended position toward the torso during closing movement of the LH delimb arm.

During closing movement of the LH delimb arm 25, the LH delimb arm 25 engages the pivot arm 62 to which the wheel 37 is coupled, starting at the point shown in FIG. 10, so as to pivot the wheel 37 toward the torso 31. The flange plate 67 of the LH delimb arm 25 (e.g., exemplarily included in the casting of that arm) includes the LH cam stop 71 and an axial driver tab 72 which engages an axial driven tab 73 of the pivot arm 62 to lift or otherwise move the wheel 37 toward the torso 31. The driven tab 73 is welded to one of the flange plates 97. Thus, the RH delimb arm 24 can close to a greater extent as the LH delimb arm 25 doses.

The LH cam stop 71 is accordingly configured to vary the extent of closure allowable for the RH delimb arm 24. The LH cam stop 71 allows the RH delimb arm 24 to close to a first extent relative to the torso 31 when the LH delimb arm 25 is positioned in an opened position, shown, for example, in FIG. 9 as its fully opened position established by contact between the LH delimb arm 25 and a stop 161 of the frame 20 (FIG. 3) (the stop 181 being welded to a plate of the frame 20 in a well-known manner), prohibiting contact between the RH grapple 38 and the wheel 37, and to a second extent relative to the torso 31 greater than the first extent when the LH delimb arm 25 is positioned in a closed position, shown, for example, in FIG. 11, prohibiting contact between the RH grapple 38 while allowing relatively small diameter timber to be grasped (e.g., having a diameter of 50 millimeters).

The RH cam stop 70 is also configured to vary the extent of closure allowable for the LH delimb arm 25. The RH cam stop 70 allows the LH delimb arm 25 to close to the first extent relative to the torso 31 when the RH delimb arm 24 is positioned in an opened position, shown, for example, in FIG. 12 as its fully opened position established by contact between the RH delimb arm 24 and a stop 180 of the frame 20 (FIG. 8) (the stop 160 being welded to a plate of the frame 20 in a well-known manner), and to the second extent relative to the torso 31 greater than the first extent when the RH delimb arm 24 is positioned in a closed position, shown, for example, in FIG. 11. Thus, when both delimb arms 24, 25 are closed, the cam stops 70, 71 allow the grapples 38, 39 to close to the same or similar extent as one another to embrace relatively small timber (e.g., having a diameter of 50 millimeters).

Each of the RH cam stop 70 and the LH cam stop 71 is shaped as a cam having a profile that is semi-U-shaped (i.e., the left or right side of a U, rather than the top or bottom) so as to comprise a first section 74 configured as the hook portion of the semi-U-shape and a second section 75 configured as the side portion of the semi-U-shape. With respect to the RH cam stop 70, the first section 74 is radially farther away from the pivot axis 64 of the RH delimb arm 74 than the second section 76 such that the profile of the RH cam stop 70 varies radially relative to the pivot axis 64. With respect to the LH cam stop 71, the first section 74 is radially farther away from the pivot axis 65 of the LH delimb arm 25 than the second section 75 such that the profile of the LH cam stop 71 varies radially relative to the pivot axis 65. Each cam stop 70, 71 may be described as a nose or as being nose-shaped, with the first section 74 included in the distal, tip portion of the nose and the second section 75 included in the proximal, base portion of the nose.

With respect to the LH cam stop 71, the RH grapple 38 of the RH delimb arm 24 is closable against different portions of the LH cam stop 71 depending upon the extent of closure of the LH delimb arm 25. The RH grapple 38 is closable against the first section 74 of the LH cam stop 71 when the LH delimb arm 25 is positioned in an opened position, such as shown, for example, in FIG. 9, and is closable against the second section 75 of the LH cam stop 71 when the LH delimb arm 25 is positioned in a closed position, such as shown, for example, in FIG. 11. The first section 74 of the LH cam stop 71 thus spaces the RH grapple 38 farther away from the torso 31 than does the second section 75 of the LH cam stop 71, accommodating the range of pivot motion of the wheel 37 while allowing the RH grapple 38 to embrace relatively small timber.

The profile of the LH cam stop 71 has a smooth, curved transition between the first and second sections 74, 75. As such, the entire profile of the LH cam stop 71 provides a smooth contact point for the RH grapple 38 should the RH grapple 38 close when the LH delimb arm 25 is positioned in the opened position, closed position, or at a position therebetween.

With respect to the RH cam stop 70, the LH grapple 39 of the RH delimb arm 24 is closable against different portions of the RH cam stop 70 depending upon the extent of closure of the RH delimb arm 24. The LH grapple 39 is closable against the first section 74 of the RH cam stop 70 when the RH delimb arm 25 is positioned in an opened position, such as shown, for example, in FIG. 12, and closable against the second section 75 of the RH cam stop 70 when the RH delimb arm 24 is positioned in a closed position, such as shown, for example, FIG. 11. The first section 74 of the RH cam stop 70 thus spaces the LH grapple 39 farther away from the torso 31 than does the second section 75 of the RH cam stop 70, accommodating the range of pivot motion of the wheel 37 in a manner that allows the LH grapple 39 to embrace relatively small timber.

The profile of the RH cam stop 70 has a smooth, curved transition between the first and second sections 74, 75. As such, the entire profile of the RH cam stop 70 provides a smooth contact point for the LH grapple 39 should the LH grapple 39 close when the RH delimb arm 24 is opened, closed, or at a position between its opened and closed positions.

The RH cam stop 70 is configured as a flange extending radially outwardly from the pivot sleeve 46 (e.g., integral with that sleeve in the case of a casting). It is positioned next to the link mount 68 in face-to-face contact therewith and extends radially outwardly farther than the ear 94 of the mount 68 so that the LH grapple 39 will contact the RH cam stop 70 instead of that ear 94.

A web 76 interconnects the RH cam stop 70, the RH grapple 38, and the RH pivot sleeve 46 for reinforcement of the RH cam stop 70, and is included in the casting of the RH delimb arm 24. A web 77 interconnects the LH cam stop 71, the LH grapple 39, and the LH pivot sleeve 47 for reinforcement of the LH cam stop 71, and is included in the casting of the LH delimb arm 25.

Since the timing link has been removed, the delimb arms 24, 25 are thus pivotable independent of one another, to accommodate sweep and other contour irregularities in the timber. The cam stops 70, 71 provide an effective limit to closure of the delimb arms 24, 25. The LH cam stop 71 limits closure of the RH delimb arm 24 so that the RH grapple 38 will not hit the measurement wheel 37 when the LH delimb arm 25 is positioned in an opened position, closed position, or position therebetween. The RH cam stop 70 limits closure of the LH delimb arm 25 when the RH delimb arm 24 is positioned in an opened position, closed position, or position therebetween. In doing so, each cam stop 70, 71 provides a smooth contact point for the grapple 38, 39 that will contact it.

Figure 13:
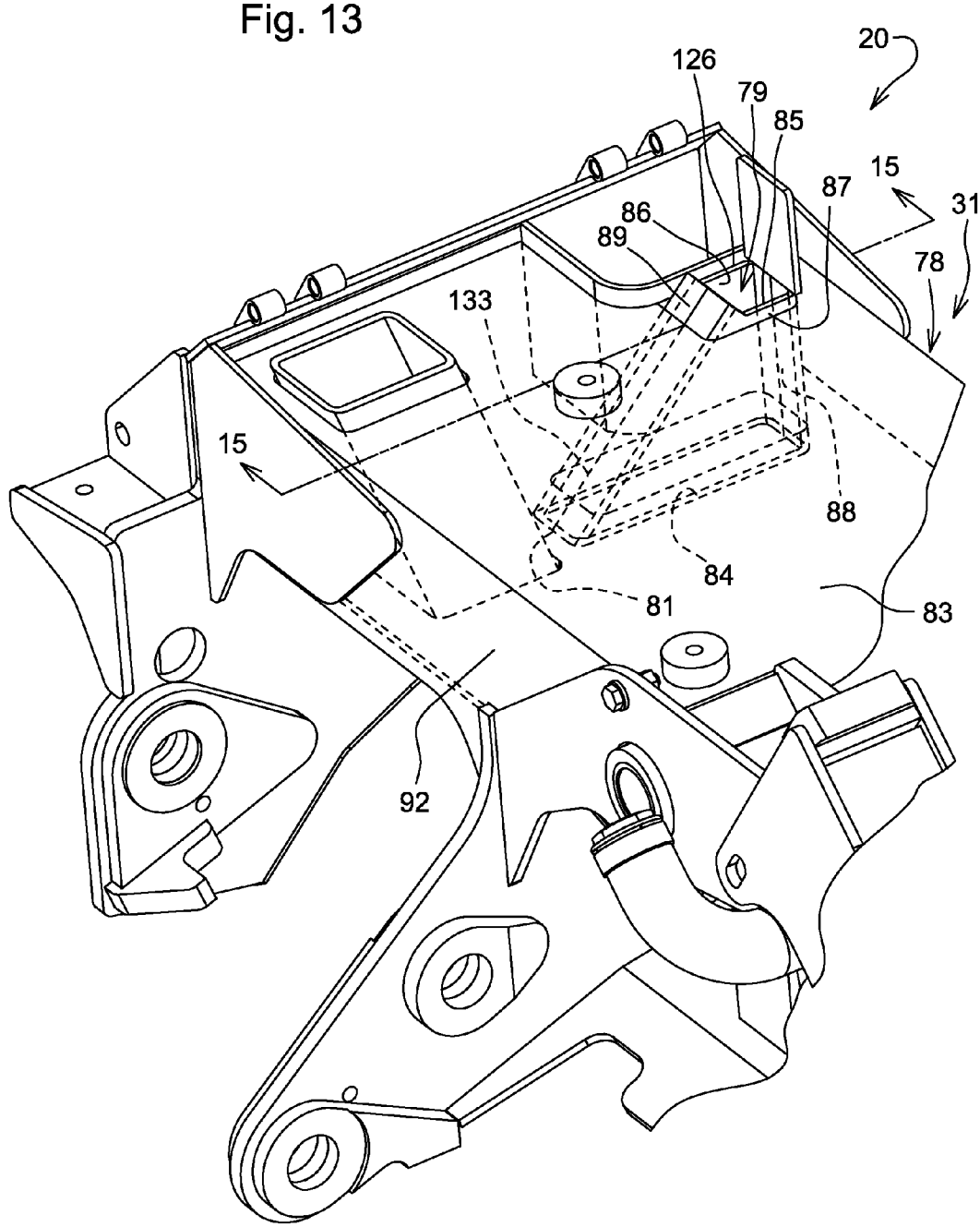
FIG. 13 is a perspective view showing a delimb hosing channel extending, in phantom, through a box enclosure of the torso of the frame.
Figure 14:
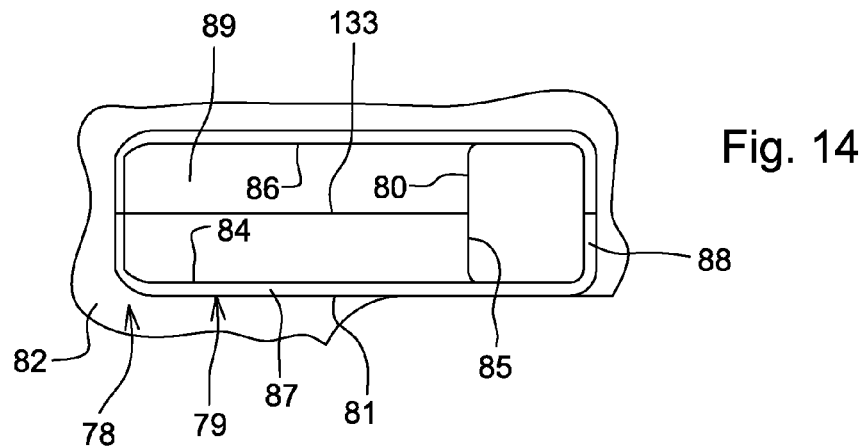
FIG. 14 is an enlarged front elevation view of the delimb hosing channel.
Figure 15:
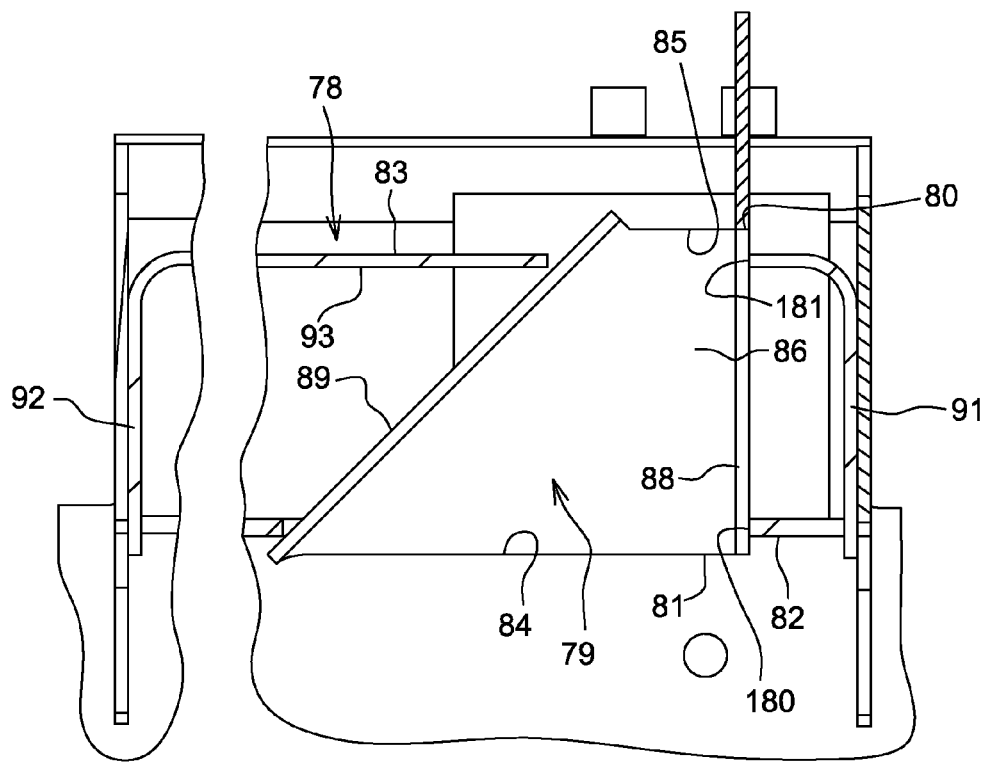
FIG. 15 is a sectional view taken along lines 15-15 of FIG. 13.

Referring to FIGS. 13-15, the torso 31 has a box enclosure 78 and a hosing channel 79 extending through a cavity 93 of the enclosure 78. The delimb cylinder hosing 80 (i.e., a supply hose and a return hose) is routed from the delimb cylinder 34 through the hosing channel 79 to the valve block mounted on the rear side of the torso 31. The hosing 80 is routed through the torso 31, rather than outside the torso 31, for protection of the hosing 80 from the relatively harsh environment in which the head 10 may operate. Further, the channel 79 is configured to accommodate lateral movement of the delimb cylinder 34, and thus the hosing 80, relative to the torso 31, thereby minimizing wear on the hosing 80 against the channel 79 to maximize the useful life of the hosing 80. Exemplarily, the channel 79 is fan-shaped to accommodate such lateral movement.

The delimb cylinder 34 is positioned in front of and is floatable relative to the torso 31. It is floatable in that the entire cylinder 34 can move relative to the torso 31. Stated otherwise, no part of it is fixed to the torso 31 or any other part of the frame 20 against movement relative thereto. Rather, its ends are mounted to the delimb arms 24, 25 such that the delimb cylinder 34 is operable to pivot the delimb arms 24, 25 relative to the frame 20 to open and close them.

The delimb cylinder 34 is oriented in its longitudinal dimension laterally relative to the torso 31. As such, the delimb cylinder 34 is floatable laterally relative to the torso 31.

The hosing channel 79 expands laterally relative to the torso 31 as the hosing channel 79 extends along its length forwardly through the box enclosure 78. Exemplarily, the channel 79 has a constant thickness, and a width which expands laterally relative to the torso 31 from a rearward end 126 of the hosing channel 79 to an opposite forward end 81 of the hosing channel 79. The hosing channel 79 has a rectangular cross-section, and the cross-section expands in area along the length of the channel 79.

The hosing channel 79 may be constructed of two formed clamshells of mild steel plate (not hardened) with edges welded together along a central seam 133. The hosing channel may thus be configured as a welded fabrication, although in other embodiments it may be, for example, a steel casting.

The enclosure 78 of the torso 31 is hollow so as to define the cavity 93 therein through which the channel 79 extends. Illustratively, the box shape of the enclosure 78 promotes the rigidity and strength of the torso 31. The enclosure 78 has a flat forward wall 82, a flat rearward wall 83, a flat RH wall 91, and a flat LH wall 92. Each wall 82, 83, 91, 92 is configured as a panel given its flat structure. The walls 83, 91, and 92 are included in a rearward component in which the rearward wall 83 interconnects the RH and LH walls 91, 92. The forward wall 82 is configured as a forward component welded to the rearward component.

The hosing channel 79 extends through a forward hole 180 of the forward wall 82 and a rearward hole 181 of the rearward wall 83. The hosing channel 79 is welded to the forward and rearward walls 82, 82 at the forward and rearward holes 180, 181, respectively (welds not shown but may be around the hosing channel 79 at the forward and rearward holes 180, 181).

The hosing channel 79 has a forward end opening 84 adjacent to the forward wall 82 and a rearward end opening 85 adjacent to the rearward wall 83. The forward end opening 84 is larger than the rearward end opening 85 in the lateral dimension of the torso 31.

The hosing channel 79 has flat parallel walls 86, 87 spaced apart from one another longitudinally relative to the torso 31 and flat non-parallel RH and LH walls 88, 89 interconnecting the walls 86, 87 and spaced apart from one another laterally relative to the torso 31. The walls 86, 87, 88, 89 interconnect the forward and rearward walls 82, 83 of the torso 31. The two walls 86, 87 are trapezoid-shaped, and the two walls 88, 89 are rectangular. The walls 86, 87, 88 are perpendicular to the forward and rearward walls 82, 83, and the LH wall 89 is slanted laterally relative to the toward and rearward walls 82, 83.

The delimb cylinder 34 comprises a connector 90 to which the delimb cylinder hosing 80 is coupled. The connector 90 has a pair of infernal passages (e.g., right angle passages) respectively coupled fluidly to a pair of galleries formed in a base of the cylinder 34 on which the connector 90 is mounted. A first of the galleries is fluidly coupled to a first port of the cylinder 34 positioned at a base end of the barrel of the cylinder 34. A second of the galleries is fluidly coupled to a second port 123 of the cylinder 34 positioned at a piston end of the barrel of the cylinder 34 via a line 124.

Referring to FIGS. 19 and 20, a hose clamp 142 positioned on the RH side of the torso 31 is coupled to the frame 20 and the delimb cylinder hosing 80 so as clamp the hosing 80, fixing a portion of the hosing 80 against movement relative to the frame 20. The hose clamp 142 is mounted adjacent to the rearward end opening 85 between the end opening 85 and the valve block.

The hose clamp 142 includes a first jaw 144, a second jaw 146, a support plate 147, a retaining plate 149, and a fastener 150. A mounting plate 148 is welded on edge to the rearward end of the RH wail 88 at the rearward end opening 85. The support plate 147 is welded to the mounting plate 148. A larger diameter portion of a fastener bore of the first jaw 144 is fitted onto an internally threaded annular boss 143 fixed (e.g., welded) to the retaining plate 149. The fastener 150 configured, for example, as an externally threaded bolt (e.g., threads not shown) extends through the retaining plate 149, the second jaw 146, and the first jaw 144 into the boss 143 so as to capture the jaws 144, 146 between the retaining plate 149 and the support plate 147 and clamp a portion of the two hoses 170, 171 between the jaws 144, 146, thereby fixing that portion of the hoses 170, 171 against movement relative to the frame 20. Upon clamping of the hoses 170, 171, the jaws 144, 146 may be spaced slightly apart from one another (e.g., as illustrated). Each hose 170, 171 is positioned in a respective hole 172 defined between the jaws 144, 146 by U-shaped recesses of the jaws 144, 146.

The jaws 144, 146 are configured, for example, the same as one another so as to be interchangeable. Exemplarily, each jaw 144, 146 is made of polypropylene and has a bore through which the fastener 150 extends, the fastener bore including a larger diameter portion and a smaller diameter portion. The jaws 144, 146 are arranged such that their fastener bores are aligned with one another. The larger diameter portions are positioned next to the support plate 147 and the retaining plate 149, respectively. The smaller diameter portions are positioned between the larger diameter portions. The larger diameter portion of the first jaw 144 is fitted onto the boss 143 such that that larger diameter portion receives the boss 143 therein with a mild interference fit therebetween.

The hose clamp 142 is, for example, a commercially available CF3 hose clamp of PI.EFFE.CI S.R.L of Italy. The Clamps Catalogue, March 2009, of that company is hereby incorporated by reference herein.

Figure 9:
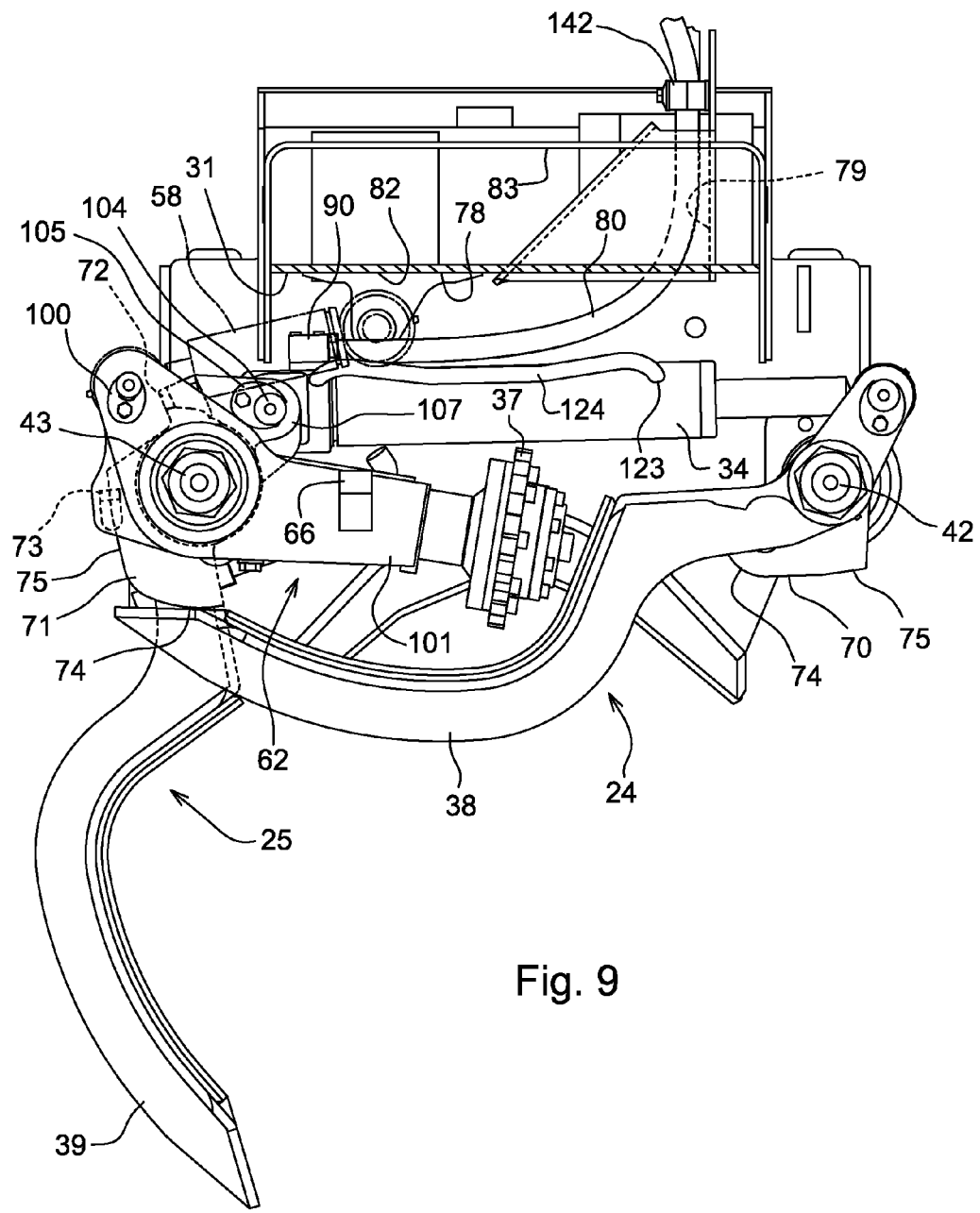
FIG. 9 is an end elevation view showing a RH grapple of the RH delimb arm engaging the LH cam stop such that the LH cam stop spaces the RH grapple apart from the length-measurement wheel when the RH delimb arm is closed, the LH delimb arm is opened, and the length-measurement wheel is positioned in a fully extended position relative to a torso of a frame of the head.
Figure 11:
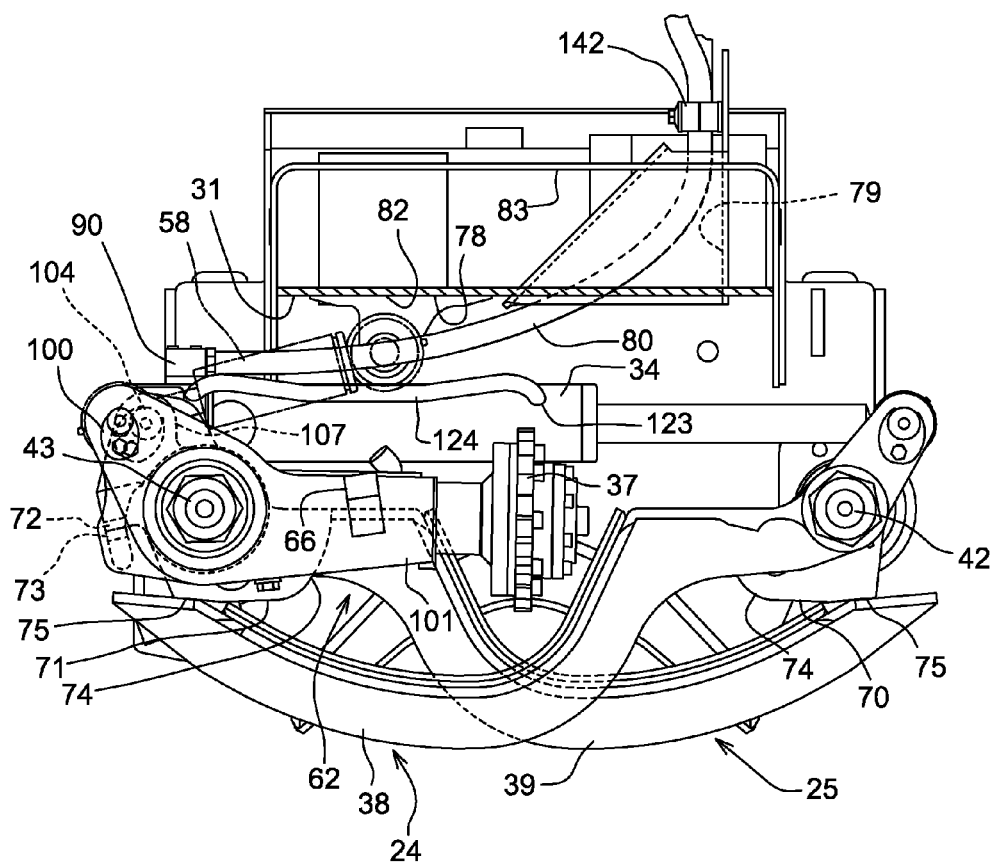
FIG. 11 is an end elevation view showing the RH grapple engaging the LH cam stop and a LH grapple of the LH delimb arm engaging the RH cam stop such that the LH cam stop spaces the RH grapple away from the length-measurement wheel and the RH cam stop allows the LH grapple to close to the same extent as the RH grapple when the RH and LH delimb arms are closed.
Figure 12:
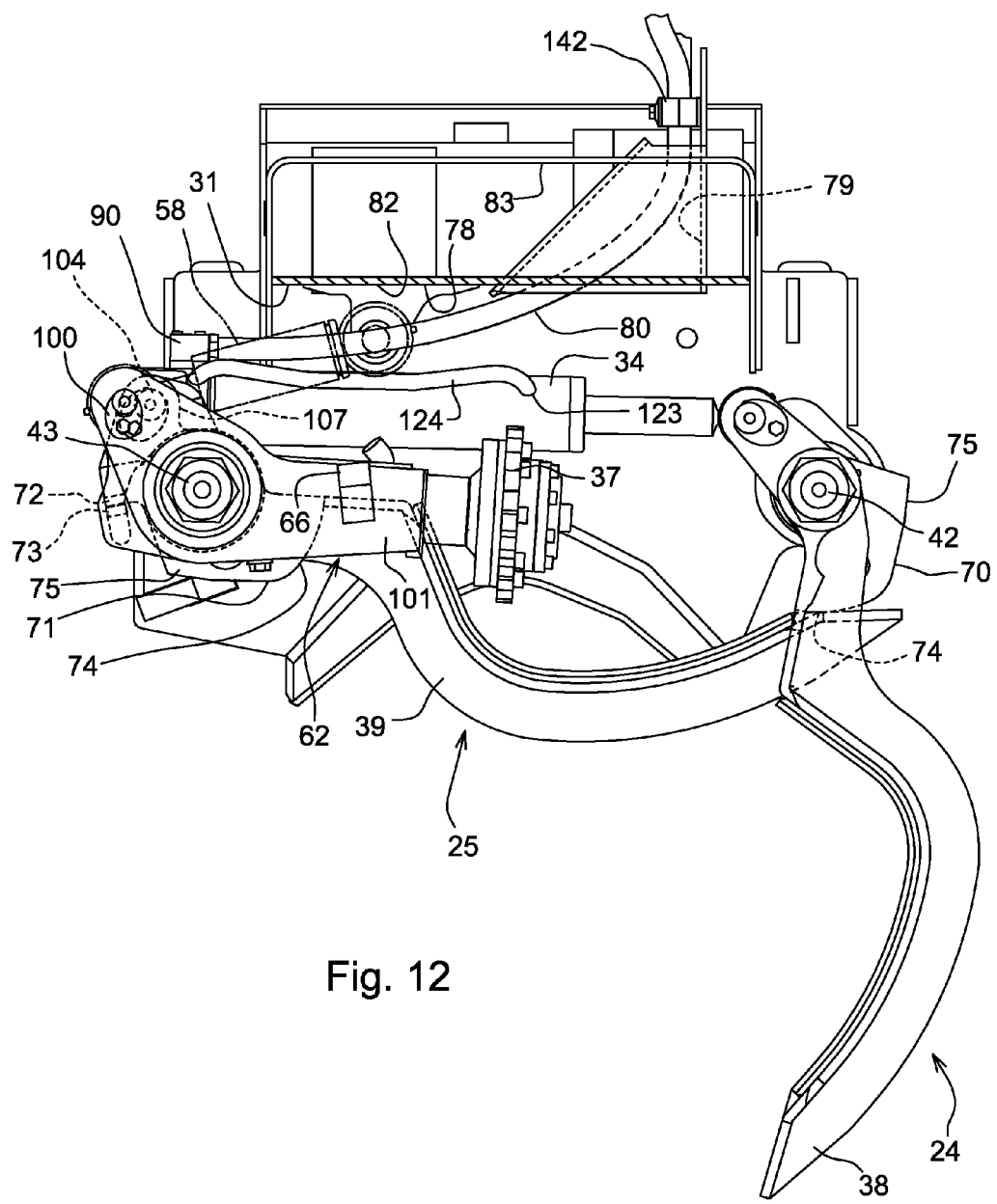
FIG. 12 is an end elevation view showing the LH grapple engaging the RH cam stop when the LH delimb arm is closed and the RH delimb arm is opened.

The channel 79 is configured to accommodate lateral movement of the connector 90 and thus the hosing 80 with the cylinder 34 in opposite directions indicated by double-headed arrow 112 (FIG. 10), the extreme RH and LH positions of the connector 90 shown, for example, in FIGS. 9 and 11, so as to prevent or at least minimize rubbing of the hosing 80 against the channel 79, or more generally the frame 20, between the connector 90 and the hose clamp 142. The connector 90 is positioned on the LH side of the delimb cylinder 34, and the hose clamp 142 is positioned on the RH side of the torso since the portion of the valve block to which the hosing 80 is coupled is positioned on the RH side of the torso 31 on the RH side of the valve block. As such, the forward end opening 84 stretches toward the left, and the rearward end opening 85 is positioned on the RH side of the torso 31, in order to facilitate routing of the hosing 80 from the connector 90 toward the respective portion of the valve block. The LH wall 89 thus slants from the rearward wall 83 to the forward wail 82 laterally toward the left relative to the torso 31.

The timber-working head 10 is illustrated as a harvesting head. In other embodiments, the timber-working head 10 may be configured as a debarking head, without any saws. As such, the debarking head may omit the timing link when used with ill-formed timber and include the cam stops 70, 71 for the delimb arms 24, 25, and/or the debarking head may include the delimb cylinder channel 79 for routing of the hosing 80 therethrough.

The small pins of head 10, such as pins 95, 99, 104, may be induction hardened to HRC 57. Further, one or both ends of the pins 95, 99, 104 (and other pins of head 10) may have an internally threaded portion (internal thread indicated by a dashed box) to facilitate removal of the pin. The internally threaded portion is configured to receive an externally-threaded adaptor to which a tool (e.g., slide hammer) can be attached to pull the pin out.

The bolt 125 is illustrated in simplified, unthreaded form. The shank has a proximal portion (represented with a larger diameter) extending from the head and a distal portion (represented with a smaller diameter) extending from the proximal portion to the tip of the screw opposite the head. The proximal portion remains unthreaded, but its diameter represents the major diameter of the thread of the distal portion, the thread having been cut or otherwise formed into the distal portion in a conventional manner. The length and diameter of the distal portion represent respectively the length of the threaded portion of the bolt and the minor diameter of the thread. The mating hole to which the bolt 125 is threaded is also represented in simplified, unthreaded form, it being understood that such hole may be threaded in a conventional manner for mating, threaded engagement with the bolt 125 (e.g., the hole is represented, for example, by the minor diameter of the internal thread).

The contemplated welds of the timber-working head have not been shown for simplification of illustration, it being understood that it would be well within the skill of one of ordinary skill in the art to provide the welds without undue experimentation. While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A timber-working head, comprising:
    a frame,
    a first delimb arm and a second delimb arm, the first and second delimb arms pivotally coupled to the frame, each of the first and second delimb arms comprising a delimbing cutting edge, and
    a single delimb cylinder mounted to both the first delimb arm and the second delimb arm so as to be floatable relative to the frame and operable to pivot the first and second delimb arms relative to the frame to open and close them, the first and second delimb arms otherwise operatively unconnected from one another allowing pivotal movement of each of the first and second delimb arms without corresponding pivotal movement of the other of the first and second delimb arms, wherein the second delimb arm comprises a cam stop defining a variable closure point for the first delimb arm, and the first delimb arm is configured to pivot into closed engagement with the cam stop such that the first delimb arm is closable into closed engagement with the cam stop to a first extent relative to a torso of the frame when the second delimb arm is positioned in a fully opened position and to a second extent relative to the torso when the second delimb arm is positioned in a fully closed position, the second extent greater than the first extent.

2. The timber-working head of claim 1, further comprising a length-measurement wheel coupled to the frame and positioned in an operational plane of a grapple of the first delimb arm, wherein the length-measurement wheel and the first delimb arm are pivotally coupled respectively to opposite sides of the frame, and the grapple of the first delimb arm is closable against the cam stop such that the cam stop spaces the grapple of the first delimb arm apart from the length-measurement wheel.

3. A timber-working head, comprising:
a frame,
a first delimb arm and a second delimb arm, the first and second delimb arms pivotally coupled to the frame, each of the first and second delimb arms comprising a delimbing cutting edge,
a single delimb cylinder mounted to both the first delimb arm and the second delimb arm so as to be floatable relative to the frame and operable to pivot the first and second delimb arms relative to the frame to open and close them, the first and second delimb arms otherwise operatively unconnected from one another allowing pivotal movement of each of the first and second delimb arms without corresponding pivotal movement of the other of the first and second delimb arms, and
a length-measurement wheel coupled to the frame and positioned in an operational plane of a grapple of the first delimb arm,
wherein the second delimb arm comprises a cam stop defining a variable closure point for the first delimb arm, the first delimb arm is configured to pivot into closed engagement with the cam stop, the grapple of the first delimb arm is closable against the cam stop such that the cam stop spaces the grapple of the first delimb arm apart from the length-measurement wheel, the length-measurement wheel is mounted to move away from a torso of the frame to a fully extended position, and the grapple of the first delimb arm is closable against the cam stop such that the cam stop spaces the grapple of the first delimb arm apart from the length-measurement wheel when the second delimb arm is positioned in an opened position and the length-measurement wheel is positioned in the fully extended position.

4. The timber-working head of claim 3, wherein the cam stop comprises a profile that is semi-U-shaped (as in the left or right side of a U) so as to comprise a first section configured as the hook portion of the semi-U-shape and a second section configured as the side portion of the semi-U-shape, the first section is radially farther away from a pivot axis of the second delimb arm than the second section, and the grapple of the first delimb arm is closable against the first section when the second delimb arm is positioned in the opened position and is closable against the second section when the second delimb arm is positioned in a closed position.

5. The timber-working head of claim 4, wherein the first section of the cam stop spaces the grapple of the first delimb arm farther apart from the torso of the frame than does the second section of the cam stop.

6. The timber-working head of claim 1, wherein the cam stop comprises a profile that varies radially relative to a pivot axis of the second delimb arm.

7. The timber-working head of claim 6, wherein the profile is semi-U-shaped (as in the left or right side of a U).

8. The timber-working head of claim 1, further comprising a first pin and a second pin, wherein the first and second pins are fixed to the frame, the first delimb arm comprises a first grapple and a first pivot sleeve in which the first pin is positioned, the second delimb arm comprises a second grapple and a second pivot sleeve in which the second pin is positioned, and the cam stop is configured as a flange plate mounted on the second pivot sleeve and in an operational plane of the first grapple.

9. The timber-working head of claim 1, further comprising a pivot arm pivotally coupled to the frame and a length-measurement wheel rotatably coupled to the pivot arm to pivot therewith relative to the frame, the cam stop is included in a flange plate of the second delimb arm, and the flange plate comprises a driver tab pivotable into engagement with a driven tab of the pivot arm to move the length-measurement wheel toward the frame during closing movement of the second delimb arm.

10. The timber-working head of claim 1, wherein the first delimb arm comprises a first cam stop defining a variable closure point for the second delimb arm, the cam stop of the second delimb arm is a second cam stop, and the second delimb arm is configured to pivot into closed engagement with the first cam stop.

11. The timber-working head of claim 10, wherein the first cam stop comprises a profile that varies radially relative to a pivot axis of the first delimb arm, and the second cam stop comprises a profile that varies radially relative to a pivot axis of the second delimb arm.

12. The timber-working head of claim 11, wherein the profile of each of the first and second cam stops is semi-U-shaped (as in the left or right side of a U).

13. A timber-working head, comprising:
a frame,
a first delimb arm and a second delimb arm, the first and second delimb arms pivotally coupled to the frame, each of the first and second delimb arms comprising a delimbing cutting edge, and
a single delimb cylinder mounted to both the first delimb arm and the second delimb arm so as to be floatable relative to the frame and operable to pivot the first and second delimb arms relative to the frame to open and close them, the first and second delimb arms otherwise operatively unconnected from one another allowing pivotal movement of each of the first and second delimb arms without corresponding pivotal movement of the other of the first and second delimb arms, wherein the second delimb arm comprises a cam stop defining a variable closure point for the first delimb arm, the first delimb arm is configured to pivot into closed engagement with the cam stop, the first delimb arm comprises a first cam stop defining a variable closure point for the second delimb arm, the cam stop of the second delimb arm is a second cam stop, the second delimb arm is configured to pivot into closed engagement with the first cam stop, the first cam stop comprises a profile that varies radially relative to a pivot axis of the first delimb arm, the second cam stop comprises a profile that varies radially relative to a pivot axis of the second delimb arm, the profile of each of the first and second cam stops is semi-U-shaped (as in the left or right side of a U), further comprising a length-measurement wheel coupled to the frame to move away from a torso of the frame to which the first and second delimb arms are pivotally coupled to a fully extended position and to retract from the fully-extended position toward the torso to a retracted position, wherein the profile of each of the first and second cam stops comprises a first section configured as the hook portion of the semi-U-shape of that cam stop and a second section configured as the side portion of the semi-U-shape of that cam stop, with respect to the first cam stop the first section is radially farther away from a pivot axis of the first delimb arm than the second section, with respect to the second cam stop the first section is radially farther away from a pivot axis of the second delimb arm than the second section, the first delimb arm comprises a first grapple, the second delimb arm comprises a second grapple, the length-measurement wheel is positioned in an operational plane of the first grapple, the first grapple is closable against the first section of the second cam stop such that the second cam stop spaces the first grapple apart from the length-measurement wheel when the second delimb arm is positioned in an opened position and the length-measurement wheel is positioned in the fully extended position, the second grapple is closable against the first section of the first cam stop when the first delimb arm is positioned in an opened position, the second delimb arm is configured to move the length-measurement wheel to the retracted position during closing movement of the second delimb arm, the first grapple is closable against the second section of the second cam stop such that the second cam stop spaces the first grapple apart from the length-measurement wheel when the second delimb arm is positioned in a closed position and the length-measurement wheel is positioned in the retracted position, the second grapple is closable against the second section of the first cam stop such that the first cam stop spaces the second grapple apart from the length-measurement wheel when the first delimb arm is positioned in a closed position.

14. The timber-working head of claim 13, wherein the first sections of the first and second cam stops space respectively the first and second grapples farther apart from a torso of the frame than do the second sections of the first and second cam stops.

15. The timber-working head of claim 10, further comprising a first pin and a second pin, wherein the first and second pins are fixed to the frame, the first delimb arm comprises a first grapple and a first pivot sleeve in which the first pin is positioned, the second delimb arm comprises a second grapple and a second pivot sleeve in which the second pin is positioned, the first cam stop is mounted on the first pivot sleeve and in an operational plane of the second grapple, the second cam stop is mounted on the second pivot sleeve and in an operational plane of the first grapple offset from the operational plane of the second grapple.

16. The timber-working head of claim 15, further comprising a pivot arm pivotally coupled to the second pin and a length-measurement wheel rotatably coupled to the pivot arm to pivot therewith about the second pin, the second cam stop is included in a flange plate of the second delimb arm mounted on the second pivot sleeve, and the flange plate comprises a driver tab pivotable into engagement with a driven tab of the pivot arm to move the length-measurement wheel toward a torso of the frame during closing movement of the second delimb arm.

17. The timber-working head of claim 1, further comprising a first feed wheel, a second feed wheel, a first feed arm, and a second feed arm, wherein the first and second feed arms are pivotally coupled to the frame to open and close relative to the frame, and the first and second feed wheels are mounted respectively to the first and second feed arms.

* * * * *